United States Patent
Hasegawa

(10) Patent No.: US 9,330,318 B2
(45) Date of Patent: May 3, 2016

(54) OBJECT DETECTION APPARATUS AND STORAGE MEDIUM

(71) Applicant: MegaChips Corporation, Osaka-shi (JP)

(72) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/387,922

(22) PCT Filed: Mar. 12, 2013

(86) PCT No.: PCT/JP2013/056733
§ 371 (c)(1),
(2) Date: Sep. 25, 2014

(87) PCT Pub. No.: WO2013/161407
PCT Pub. Date: Oct. 31, 2013

(65) Prior Publication Data
US 2015/0078666 A1   Mar. 19, 2015

(30) Foreign Application Priority Data

Apr. 26, 2012   (JP) ................. 2012-100673

(51) Int. Cl.
*G06K 9/46*   (2006.01)
*G06T 7/00*   (2006.01)
(Continued)

(52) U.S. Cl.
CPC .......... *G06K 9/00791* (2013.01); *G06K 9/4604* (2013.01); *G06K 9/4652* (2013.01); *G06T 7/0046* (2013.01); *G06T 7/608* (2013.01);
(Continued)

(58) Field of Classification Search
None
See application file for complete search history.

(56) References Cited

U.S. PATENT DOCUMENTS

2003/0156737 A1    8/2003   Ohtsuka et al.
2004/0240753 A1*  12/2004   Hu .......................... G06T 7/608
                                                    382/286
(Continued)

FOREIGN PATENT DOCUMENTS

EP    0356727 A2 *  3/1990  ........... G06K 9/3216
JP    H10-162118    6/1998
(Continued)

OTHER PUBLICATIONS

Loy, Gareth, and Jan-Olof Eklundh. "Detecting symmetry and symmetric constellations of features." Computer Vision—ECCV 2006. Springer Berlin Heidelberg, 2006. 508-521.*

(Continued)

*Primary Examiner* — Kim Vu
*Assistant Examiner* — Nathan Bloom
(74) *Attorney, Agent, or Firm* — Oblon, McClelland, Maier & Neustadt, L.L.P.

(57) ABSTRACT

Important information about an object is detected using less arithmetic processing. An object detection unit generates an edge image from a color image. The object detection unit evaluates symmetry of an image included in the edge image. The object detection unit identifies a symmetry center pixel forming an object having symmetry. The object detection detects an object width for each symmetry center pixel. The object detection unit identifies the width of the object in the vertical direction based on the width of the symmetry center pixels in the vertical direction, and identifies the width of the object in the horizontal direction based on the object width identified for each symmetry center pixel.

11 Claims, 20 Drawing Sheets

(51) Int. Cl.
 *G06T 7/60* (2006.01)
 *G06K 9/00* (2006.01)
(52) U.S. Cl.
 CPC .............. *G06T2207/10016* (2013.01); *G06T 2207/10024* (2013.01); *G06T 2207/20068* (2013.01); *G06T 2207/30252* (2013.01)

(56) References Cited

U.S. PATENT DOCUMENTS

| | | | | |
|---|---|---|---|---|
| 2009/0028389 | A1* | 1/2009 | Edanami | G06K 9/468 382/104 |
| 2009/0028403 | A1* | 1/2009 | Bar-Aviv | G06F 19/321 382/128 |
| 2009/0066490 | A1 | 3/2009 | Mitzutani et al. | |

FOREIGN PATENT DOCUMENTS

| | | |
|---|---|---|
| JP | 2000-39306 | 2/2000 |
| JP | 2007-235950 | 9/2007 |
| JP | 2008-293116 | 12/2008 |
| JP | 2010-177780 | 8/2010 |
| JP | 2010-177780 A | 8/2010 |
| JP | 2010-267257 | 11/2010 |
| JP | 2011-65434 | 3/2011 |

OTHER PUBLICATIONS

O'Mara D.; Owens, R., "Measuring bilateral symmetry in digital images," TENCON '96. Proceedings., 1996 IEEE TENCON. Digital Signal Processing Applications , vol. 1, no., pp. 151,156 vol. 1, Nov. 26-29, 1996.*
Liu, Yanxi, Robert T. Collins, and Yanghai Tsin. "A computational model for periodic pattern perception based on frieze and wallpaper groups." Pattern Analysis and Machine Intelligence, IEEE Transactions on 26.3 (2004): 354-371.*
U.S. Appl. No. 14/394,558, filed Oct. 15, 2014, Hasegawa.
U.S. Appl. No. 14/382,654, filed Sep. 3, 2014, Hasegawa.
Soo Siang Teoh et al. "Symmetry-based monocular vehicle detection system", Machine Vision and Applications, Springer, Berlin, Germany, vol. 23, No. 5, Jul. 8, 2011, pp. 831-842.
Christian Nunn et al. "A two stage detection module for traffic signs", Vehicular Electronics and Safety, 2008. ICVES 2008. IEEE International Conference On, IEEE, Piscataway, NJ, USA, Sep. 22, 2008, pp. 248-252.
International Search Report issued May 7, 2013, in PCT/JP2013/056733, filed Mar. 12, 2013.
European Communication pursuant to Article 94(3) EPC issued Nov. 20, 2015 in European Patent Application No. 13 768 099.7.
EPO communication issued Nov. 10, 2015, in Patent Application No. 13768099.7.
Rien Van Leeuwen: "Motion estimation and interpretation for in-car systems", May, 22, 2002, pp. 1-144 (http://dare.uva.nl/record/1/202930).
Broggi A. et al: "Multi-resolution vehicle detection using artificial vision", Intelligent Vehicles Symposium, Jun. 14, 2004, pp. 310-314.
Bertozzi M. et al: "Stereo vision-based vehicle detection" Intelligent Vehicles Symposium, Oct. 3, 2000, pp. 39-44.

* cited by examiner

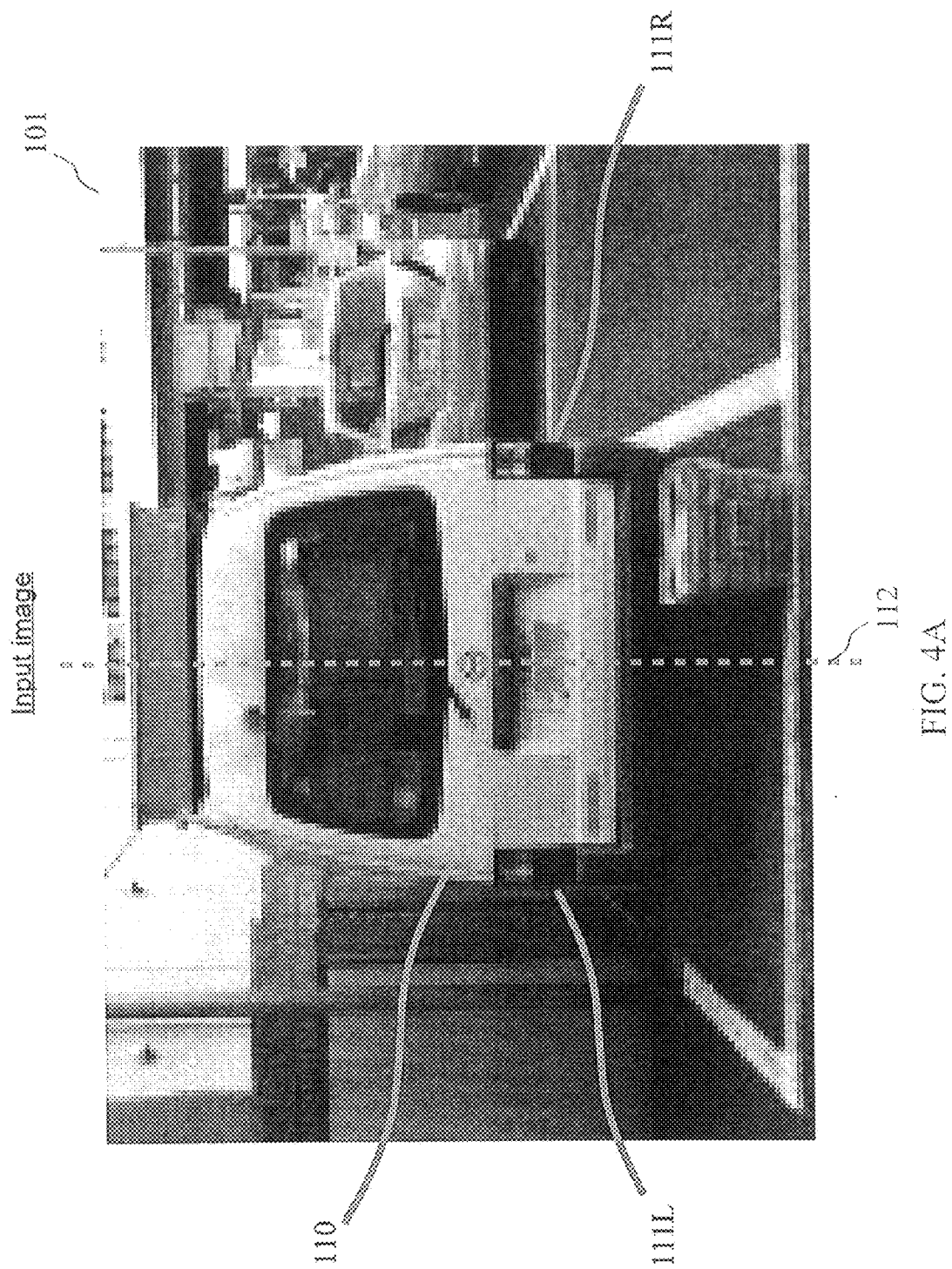

OBJECT DETECTION APPARATUS AND STORAGE MEDIUM

TECHNICAL FIELD

The present invention relates to an apparatus and a method for detecting a symmetrical object included in an image.

BACKGROUND ART

Some image processing techniques use symmetries of objects. Patent Literature 1 below describes a technique for evaluating the correlation between image areas located right and left to each target pixel by calculating the correlation between the right and the left of the target pixel. This technique detects a target pixel for which the calculated correlation is the highest as the center of a symmetrical object.

CITATION LIST

Patent Literature

Patent Literature 1: Japanese Unexamined Patent Publication No. 2010-267257

DISCLOSURE OF INVENTION

Technical Problem

Techniques for detecting objects have many applications in a variety of fields. Applications using information about detected objects, which typically use information about the position of an object, may further need the size of an object as important information.

However, it has been difficult to obtain information about both the position and the size of an object included in an image with high accuracy without increasing the processing load.

In response to the above problem, it is an object of the present invention to provide a technique for detecting important information about an object (e.g., information about the position and the size of an object) using less arithmetic processing.

Solution to Problem

To solve the above problem, an object detection apparatus according to a first aspect of the invention includes an image input unit, an image feature quantity extraction unit, and a symmetry evaluation unit.

The image input unit receives an image.

The image feature quantity extraction unit extracts a predetermined image feature quantity from the image to generate a feature-quantity extraction image.

The symmetry evaluation unit sets, for every processing target pixel in the feature-quantity extraction image, a symmetry evaluation area for evaluating symmetry in a first direction in the image in such a manner that the symmetry evaluation area is symmetrical with respect to a central axis in a second direction orthogonal to the first direction, and calculates a weighted value resulting from weighting a value indicating a correlation value by an image feature quantity for a group of pixels included in the symmetry evaluation area and located symmetrical with respect to the central axis, while varying a size of the symmetry evaluation area to obtain a symmetry evaluation value indicating a degree of the symmetry in the first direction. The correlation value indicates a correlation between image feature quantities of the group of pixels.

This object detection apparatus obtains the symmetry evaluation value using the value resulting from weighting of a value indicating a correlation between image feature quantities of a group of pixels located symmetrical to each other with respect to the central axis based on the image feature quantities of the group of pixels, and thus can evaluate symmetry in the first direction with high accuracy.

Using the symmetry evaluation value obtained by the object detection apparatus enables a highly symmetrical object to be detected with high accuracy using less arithmetic processing.

The width of the symmetry evaluation area in the second direction (orthogonal to the first direction) may be a width corresponding to one pixel, or a width corresponding to a plurality of pixels.

The group of pixels located symmetrical with respect to the central axis is a concept that includes (1) two pixels located at the same distance from the central axis in the opposite directions in an image (e.g., two pixels, or a pixel P1 at the distance k from the central axis to the left in the horizontal direction when the first direction is the horizontal direction and a pixel P2 at the distance k from the central axis to the right in the horizontal direction), or (2) a plurality of pixels located at the same distance from the central axis in the opposite directions in an image (e.g., n pixels at the distance k from the central axis to the left in the horizontal direction when the first direction is the horizontal direction, and n pixels at the distance k from the central axis to the right in the horizontal direction).

Further, the value indicating the correlation between the image feature quantities is a value indicating the degree of correlation of the image feature quantities. The value indicates a higher correlation when, for example, the correlation between the pixel values of two pixels included in a feature-quantity extraction image is higher (e.g., the two pixel values have a small difference between them or the ratio of the two pixel values is close to 1).

A second aspect of the invention provides the object detection apparatus of the first aspect of the invention in which the symmetry evaluation unit determines a width of the first-direction symmetry based on the size of the symmetry evaluation area corresponding to the symmetry evaluation value indicating the highest symmetry in the first direction.

This object detection apparatus evaluates symmetry in the first direction in the image obtained by extracting the image feature quantity from the input image, and thus evaluates symmetry while varying the size of the symmetry evaluation area (e.g., the width in the first direction). Thus, when determining that a predetermined image area has high symmetry, the object detection apparatus can obtain the size of the image area determined to have high symmetry (e.g., the width in the first direction) at the same time. In other words, this object detection apparatus can detect the position and the size of an object at one time using the symmetry of the object included in the image.

Thus, the object detection apparatus can detect a highly symmetrical object with high accuracy using less arithmetic processing.

A third aspect of the invention provides the object detection apparatus of one of the first and second aspects of the invention in which the symmetry evaluation unit calculates the symmetry evaluation value for the target pixel using Formula 1 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, and 2w+1 is a width of the symmetry evaluation area in the first direction.

Formula 1

$$SYM_w(i, j) = \frac{1}{w}\sum_{k=1}^{w} \{(P\max - |P_{i-k} - P_{i+k}|) * P_{i-k} * P_{i+k}\} \quad (1)$$

Through the processing written as Formula 1, this object detection apparatus obtains the symmetry evaluation value using the value resulting from weighting a value (Pmax−|$P_{i-k}$−$P_{i+k}$|) by a value ($P_{i-k}$×$P_{i+k}$) indicating image feature quantities of a group of pixels. The value (Pmax−|$P_{i-k}$−$P_{i+k}$|) indicates a correlation between image feature quantities of a group of pixels located symmetrical to each other with respect to the central axis. The object detection apparatus can thus evaluate symmetry in the first direction with high accuracy.

Using the symmetry evaluation value obtained by the object detection apparatus enables a highly symmetrical object to be detected with high accuracy using less arithmetic processing.

In the processing written as Formula 1 above, the range of values of the symmetry evaluation value $SYM_w(i, j)$ may be adjusted by gain adjustment (coefficient adjustment), normalization, or clipping to a predetermined value (the processing modified from Formula 1 above may be performed).

The maximum value Pmax may be a maximum value of possible pixel values in the feature-quantity extraction image or may be a predetermined value equal to or greater than the maximum value.

A fourth aspect of the invention provides the object detection apparatus of one of the first and second aspects of the invention in which the symmetry evaluation unit calculates the symmetry evaluation value for the target pixel using Formula 2 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_{i,j}$ is a pixel value of the target pixel located at coordinates (i, j) in the feature-quantity extraction image, 2w+1 is a width of the symmetry evaluation area in the first direction, 2n+1 is a width of the symmetry evaluation area in the second direction, and d(m) is a predetermined weighting function.

Formula 2

$$SYM_w(i, j) = \frac{1}{2n+1} \sum_{m=j-n}^{j+n} \left[ d(m) * \frac{1}{w} \sum_{k=1}^{w} \{(P\max - |P_{i-k,m} - P_{i+k,m}|) * P_{i-k,m} * P_{i+k,m}\} \right] \quad (2)$$

The symmetry evaluation unit may also calculate the symmetry evaluation value for the target pixel using Formula 3 given below.

Formula 3

$$SYM_w(i, j) = \frac{1}{w} \sum_{k=1}^{w} \left[ \left( P\max - \frac{1}{2n+1} \left| \sum_{m=j-n}^{j+n} d(m) * P_{i-k,m} - \sum_{m=j-n}^{j+n} d(m) * P_{i+k,m} \right| \right) * \left\{ \frac{1}{2n+1} \sum_{m=j-n}^{j+n} (d(m) * P_{i-k,m}) \right\} * \left\{ \frac{1}{2n+1} \sum_{m=j-n}^{j+n} (d(m) * P_{i+k,m}) \right\} \right] \quad (3)$$

Through the processing written as Formula 2 or 3, this object detection apparatus obtains the symmetry evaluation value using the average value obtained by accumulating, in the second direction, the values resulting from weighting a value (Pmax−|$P_{i-k}$−$P_{i+k}$|) by a value ($P_{i-k}$×$P_{i+k}$) indicating image feature quantities of a group of pixels. The value (Pmax−|$P_{i-k}$−$P_{i+k}$|) indicates a correlation between image feature quantities of a group of pixels located symmetrical to each other with respect to the central axis. The object detection apparatus can thus evaluate symmetry in the first direction with high accuracy.

Using the symmetry evaluation value obtained by the object detection apparatus enables a highly symmetrical object to be detected with high accuracy using less arithmetic processing.

The maximum value Pmax may be a maximum value of possible pixel values in the feature-quantity extraction image or may be a predetermined value equal to or greater than the maximum value.

A fifth aspect of the invention provides the object detection apparatus of the fourth aspect of the invention in which the weighting function d(m) is $$d(m)=1, \quad (1)$$

$$d(m)=n+1-|m-j|, \text{ or} \quad (2)$$

$$d(m)=c1 \times \exp(-c2 \times (m-j)^2), \quad (3)$$

where c1 and c2 are predetermined positive coefficients.

This object detection apparatus can perform any intended weighting when the values are accumulated in the second direction. When, for example, (1) d(m)=1, the values accumulated in the second direction are weighted by uniform weighting. When (2) d(m)=n+1−|m−j|, the values accumulated in the second direction are weighted with a larger value closer to the center of the symmetry evaluation area in the second direction (with the largest value when m=j). When (3)

$d(m)=c1\times\exp(-c2\times(m-j)^2)$, the values accumulated in the second direction are weighted with a larger value closer to the center of the symmetry evaluation area in the second direction (with the largest value when m=j).

A sixth aspect of the invention provides the object detection apparatus of one of the third to fifth aspects of the invention in which the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A seventh aspect of the invention provides the object detection apparatus of one of the first to sixth aspects of the invention in which (1) when a value of a row i indicating a position of the target pixel in the first direction is equal to or less than H/2, the symmetry evaluation unit calculates the symmetry evaluation value by varying a value of w within a range of $1 \leq w \leq (i-1)$, where w is a half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of $1 \leq w \leq (H-i)$.

This object detection apparatus ensures that the symmetry evaluation area is symmetrical with respect to the target pixel, and can detect the symmetry evaluation value using a maximum area among horizontally symmetrical areas with respect to the target pixel.

An eighth aspect of the invention provides the object detection apparatus of the first to seventh aspects of the invention in which the image feature quantity is an edge intensity of the image.

This object detection apparatus can detect a highly symmetrical object by using an edge component of an image, and thus can detect an object having high symmetry at the contour (outline) of the object with high accuracy.

A ninth aspect of the invention provides the object detection apparatus of one of the first to seventh aspects of the invention in which the image feature quantity is an intensity of a specific color component of the image.

This object detection apparatus can detect a highly symmetrical object by using a specific color component of an object (e.g., a red component), and thus can detect an object having high symmetry for a specific component with high accuracy.

A tenth third aspect of the invention provides a non-transitory computer-readable storage medium having stored thereon a program enabling a computer to implement an object detection method. The object detection method includes an image input step, a feature quantity extraction step, and a symmetry evaluation step.

In the image input step, an input image is received.

In the feature quantity extraction step, a predetermined image feature quantity is extracted from the image to generate a feature-quantity extraction image.

In the symmetry evaluation step, a symmetry evaluation area for evaluating symmetry in a first direction in the image is set for every processing target pixel in the feature-quantity extraction image in such a manner that the symmetry evaluation area is symmetrical with respect to a central axis in a second direction orthogonal to the first direction, and a weighted value resulting from weighting a value indicating a correlation value by an image feature quantity for a group of pixels included in the symmetry evaluation area and located symmetrical with respect to the central axis is calculated, while varying a size of the symmetry evaluation area to obtain a symmetry evaluation value indicating a degree of the symmetry in the first direction. The correlation value indicates a correlation between image feature quantities of the group of pixels.

The program enabling the computer to implement the object detection method has the same advantageous effects as the object detection apparatus of the first aspect of the present invention.

Advantageous Effects

The technique of the present invention enables the position and the size of an object to be detected based on symmetry of an object in an input image, and thus enables important information about an object (e.g., information about the position and the size of an object) to be detected using less arithmetic processing.

BRIEF DESCRIPTION OF DRAWINGS

FIG. 4A shows an input image 101 including a symmetrical object.

DESCRIPTION OF THE PREFERRED EMBODIMENTS

Figure 1:
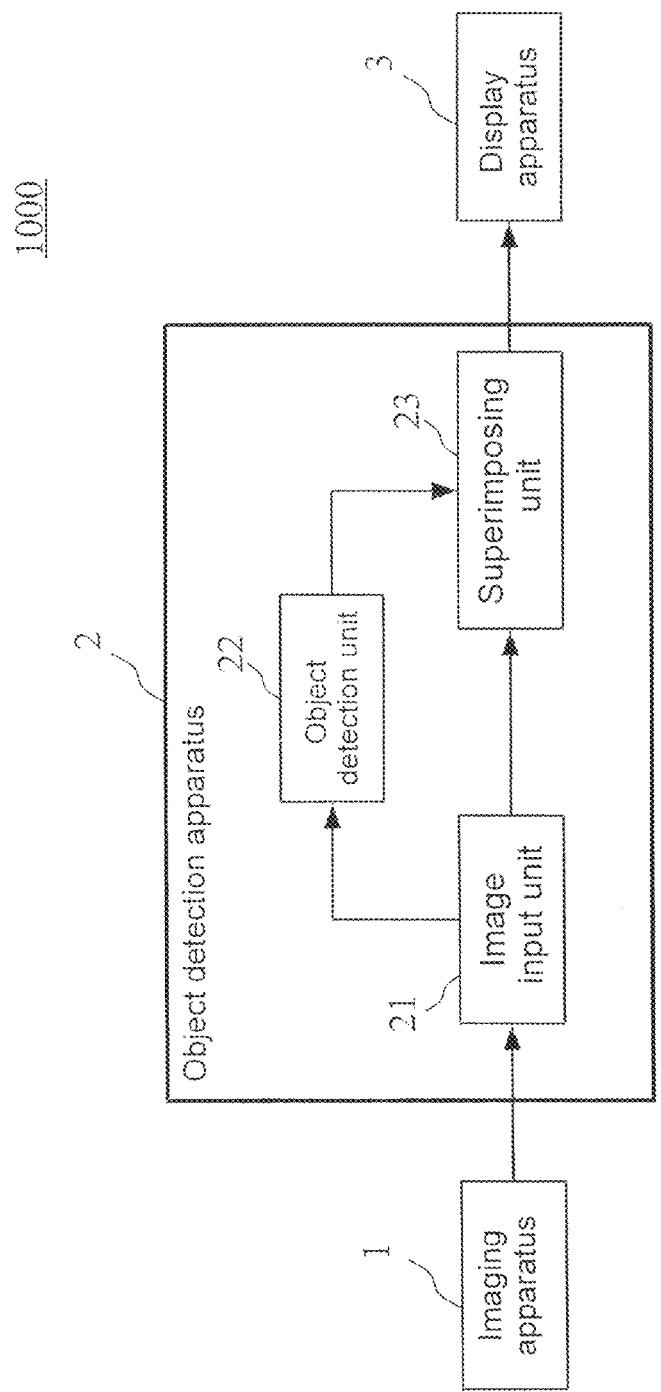
FIG. 1 is a block diagram of an object detection system 1000 according to a first embodiment.

First Embodiment
A first embodiment will now be described with reference to the drawings.
1.1 Structure of Object Detection System FIG. 1 is a block diagram of an object detection system 1000 according to a first embodiment. The object detection system 1000 includes an imaging apparatus 1, an object detection apparatus 2, and a display apparatus 3.

The imaging apparatus 1 includes an optical system (not shown) and an image sensor. The optical system focuses light from a subject. The image sensor, which may be, for example, a charge-coupled device (CCD) image sensor or a complementary metal oxide semiconductor (CMOS) image sensor (not shown), converts the light focused through the optical system to image signals (electrical signals) by photoelectric conversion. The imaging apparatus 1 outputs the image captured by the image sensor (image signals) to the object detection apparatus 2.

The object detection apparatus 2 receives image signals output from the imaging apparatus 1, and detects a symmetrical object included in an image formed using the input image signals, and outputs an image (image signals) indicating the detection result to the display apparatus 3.

In one example, the object detection apparatus 2 is mounted on a vehicle. When mounted on the front side of the vehicle, the imaging apparatus 1 captures an image (scene) of the environment in front of the vehicle. Alternatively, the imaging apparatus 1 may be mounted on the rear side of the vehicle to capture an image (scene) of the environment behind the vehicle.

The display apparatus (monitor) 3 is mounted on, for example, the dashboard of the vehicle. The display apparatus 3 may also function as a monitor for a navigation system.

As shown in FIG. 1, the object detection apparatus 2 includes an image input unit 21, an object detection unit 22, and a superimposing unit 23.

The image input unit 21 receives an image (image signals) output from the imaging apparatus 1. When, for example, the imaging apparatus 1 includes a CCD image sensor including an RGB Bayer array of color filters, the image input unit 21 receives a sequence of pixel signals including an R-component signal, a G-component signal, and a B-component signal. The image input unit 21 converts the input image signals to signals in a predetermined format as appropriate, and outputs the resulting image signals (unconverted image signals when no conversion is performed) to the object detection unit 22. The image input unit 21 outputs the input image signals to the superimposing unit 23.

The conversion into a predetermined format refers to, for example, conversion from one color space to the other (e.g., conversion from the RGB color space to the YCbCr color space). The image input unit 21 converts, as appropriate, the input image signals defined in the RGB color space (an R-component signal, a G-component signal, and a B-component signal) to, for example, signals defined in the YCbCr color space (a Y-component signal, a Cb-component signal, and a Cr-component signal).

In the example described below, for ease of explanation, the input image signals in the RGB color space (an R-component signal, a G-component signal, and a B-component signal) are converted to signals in the YCbCr color space (a Y-component signal, a Cb-component signal, and a Cr-component signal) in the image input unit 21.

The object detection unit 22 receives an image (image signals) output from the image input unit 21, and subjects the input image to predetermined image processing to detect a symmetrical object included in an image formed using the image signals (e.g., a frame image) (identifies an image area corresponding to a symmetrical object). The object detection unit 22 outputs the detection result (e.g., information identifying an image area corresponding to a symmetrical object) to the superimposing unit 23.

Figure 2:
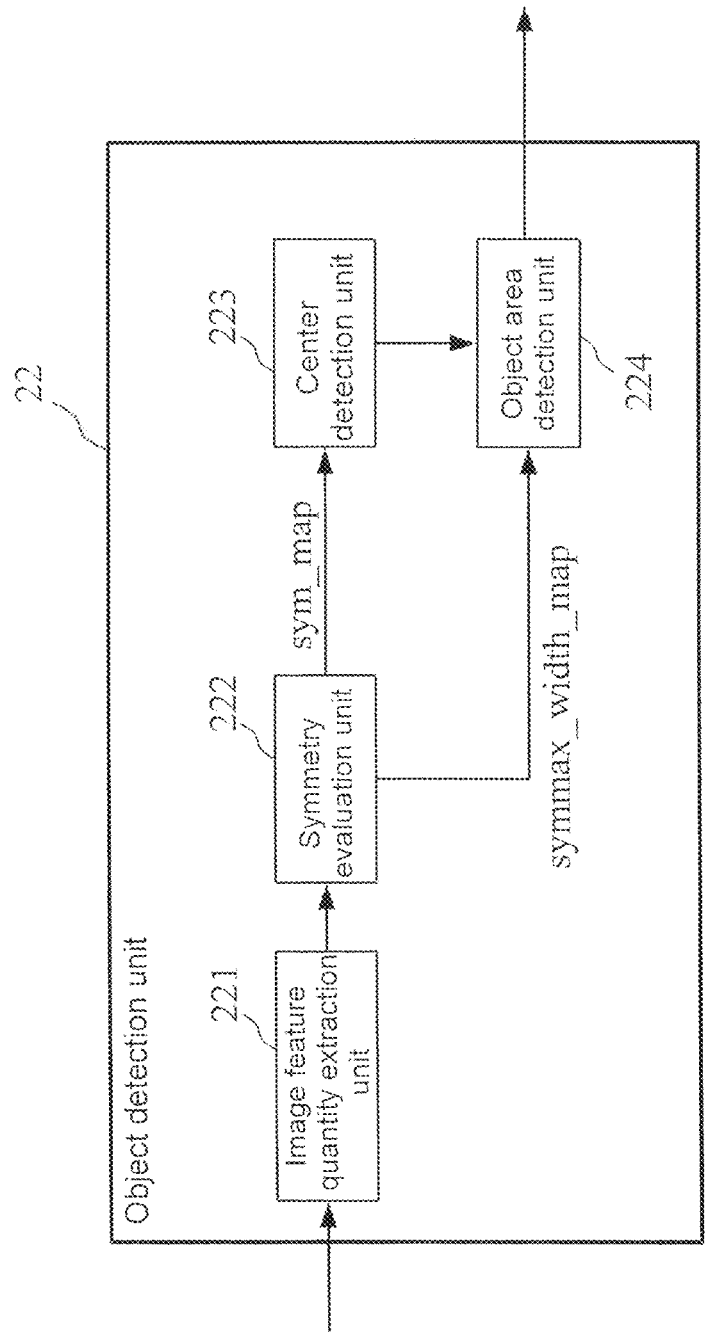
FIG. 2 is a block diagram of an object detection unit 22 according to the first embodiment.

As shown in FIG. 2, the object detection unit 22 includes an image feature quantity extraction unit 221, a symmetry evaluation unit 222, a center detection unit 223, and an object area detection unit 224.

The image feature quantity extraction unit 221 calculates (extracts) an image feature quantity from an image output from the image input unit 21. More specifically, the image feature quantity extraction unit 221 performs differential arithmetic processing using the Sobel filter and extracts, for example, an edge component as an image feature quantity from a Y-component image (luminance component image) formed using a Y-component signal (luminance component signal) output from the image input unit 21. The image feature quantity extraction unit 221 outputs an image in which each pixel has the extracted edge component as its pixel value (feature-quantity extraction image) to the symmetry evaluation unit 222 and the object area detection unit 224 as an image feature-quantity extraction image.

For ease of explanation, the pixel value of each pixel in the feature-quantity extraction image is hereafter larger as the image feature quantity to be extracted is larger.

The symmetry evaluation unit 222 receives an image (feature-quantity extraction image) extracted from the image feature quantity extraction unit 221. For the feature-quantity extraction image, the symmetry evaluation unit 222 evaluates (determines) symmetry of each pixel in a predetermined direction (e.g., the horizontal direction) in an image, and determines (estimates) the width of an image area (width in the predetermined direction, or for example the horizontal direction). The symmetry evaluation unit 222 obtains symmetry evaluation map data indicating the correspondence for each pixel between information identifying each pixel (processing target pixel) (e.g., the coordinates of each pixel) and a value indicating the degree of symmetry evaluated (determined) for the pixel (or a value correlated with this value).

Further, the symmetry evaluation unit 222 obtains symmetry width map data indicating the correspondence for each pixel between information identifying each pixel (processing target pixel) (e.g., the coordinates of each pixel) and a value indicating the width of a highly symmetrical image area evaluated (determined) for the pixel (the width in the predetermined direction, or for example the horizontal direction) (or a value correlated with this value).

The symmetry evaluation unit 222 outputs the obtained symmetry evaluation map data to the center detection unit 223. The symmetry evaluation unit 222 also outputs the obtained symmetry width map data to the object area detection unit 224.

The center detection unit 223 receives the symmetry evaluation map data obtained by the symmetry evaluation unit 222. The center detection unit 223 identifies a pixel or a pixel area having a maximum local value (or a value close to a maximum local value) in the predetermined direction in the image (e.g., the horizontal direction) when the symmetry evaluation map data is a two-dimensional image (an image generated through mapping of symmetry evaluation values serving as the pixel values of the pixels), and determines (estimates) the position of the central axis of the highly symmetrical object based on the identified pixel or pixel area. The center detection unit 223 then outputs information about the position of the central axis (in the image) of the determined (estimated) highly symmetrical object to the object area detection unit 224.

The object area detection unit 224 receives the symmetry width map data obtained by the symmetry evaluation unit 222, and the information about the position of the central axis (in the image) of the highly symmetrical object output from the center detection unit 223. The object area detection unit 224 detects the highly symmetrical object based on the symmetry width map data, and the information about the position of the central axis (in the image) of the highly symmetrical object, and identifies an area corresponding to the detected highly symmetrical object in the image. The object area detection unit 224 then outputs information about the identified image area corresponding to the highly symmetrical object in the image to the superimposing unit 23.

The superimposing unit 23 receives the image output from the image input unit 21, and the information identifying the image area corresponding to the detected highly symmetrical object in the image output from the object area detection unit 224 of the object detection unit 22. The superimposing unit 23 generates (superimposes) an image indicating the image area corresponding to the highly symmetrical object on the image output from the image input unit 21 based on the information about the image area corresponding to the detected highly symmetrical object output from the object area detection unit 224. The superimposing unit 23 generates (superimposes) an image of a rectangular frame indicating the image area corresponding to the highly symmetrical object on the image output from the image input unit 21. The superimposing unit 23 then outputs the resulting composite image to the display apparatus 3.

The display apparatus 3 receives the image output from the superimposing unit 23 of the object detection apparatus 2, and displays the image.

1.2 Operation of Object Detection System

The operation of the object detection system 1000 with the above-described structure will now be described with reference to the drawings.

Figure 3:
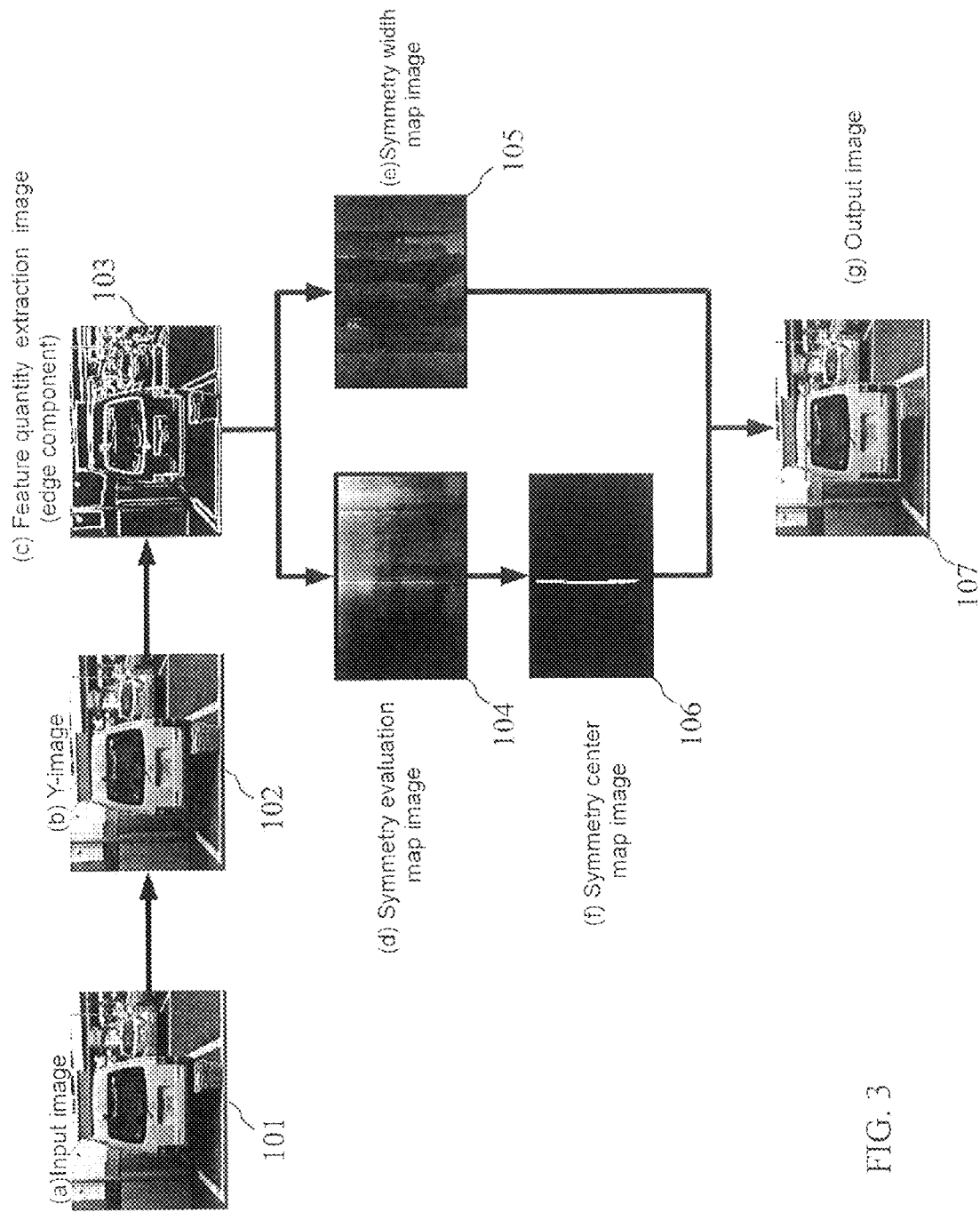
FIG. 3 is a diagram showing example images generated in the steps of object detection implemented by the object detection system 1000 of the first embodiment.

FIG. 3 shows example images generated in the steps of object detection implemented by the object detection system 1000.

FIG. 4A shows a captured image 101 captured by the imaging apparatus 1 and input into the object detection apparatus 2.

As shown in FIG. 4A, the captured image 101 includes a vehicle 110 as a subject. The vehicle 110 includes right and left tail lamps 111R and 111L. The right and left tail lamps 111R and 111L are arranged symmetrical to each other with respect to a central axis 112 in the width direction of the vehicle 110.

In the example described below, the captured image 101 shown in FIG. 4A is captured by the imaging apparatus 1, and the captured image 101 is processed by the object detection apparatus 2.

The captured image 101 (an image signal forming the captured image 101) obtained by the imaging apparatus 1 is input into the image input unit 21 of the object detection apparatus 2. The captured image 101 is formed by the R-component signal, the G-component signal, and the B-component signal.

The image input unit 21 subjects the input captured image to color space conversion. More specifically, the image input unit 21 converts the RGB color space to, for example, the YCbCr color space to form the captured image 101. The R-component signal, the G-component signal, and the B-component signal are converted to the Y-component signal, the Cb-component signal, and the Cr-component signal.

The image input unit 21 outputs a Y-image (luminance image) formed by the Y-component signal (luminance signal) to the image feature quantity extraction unit 221 of the object detection unit 22. The image input unit 21 outputs the input captured image to the superimposing unit 23.

Figure 4B:
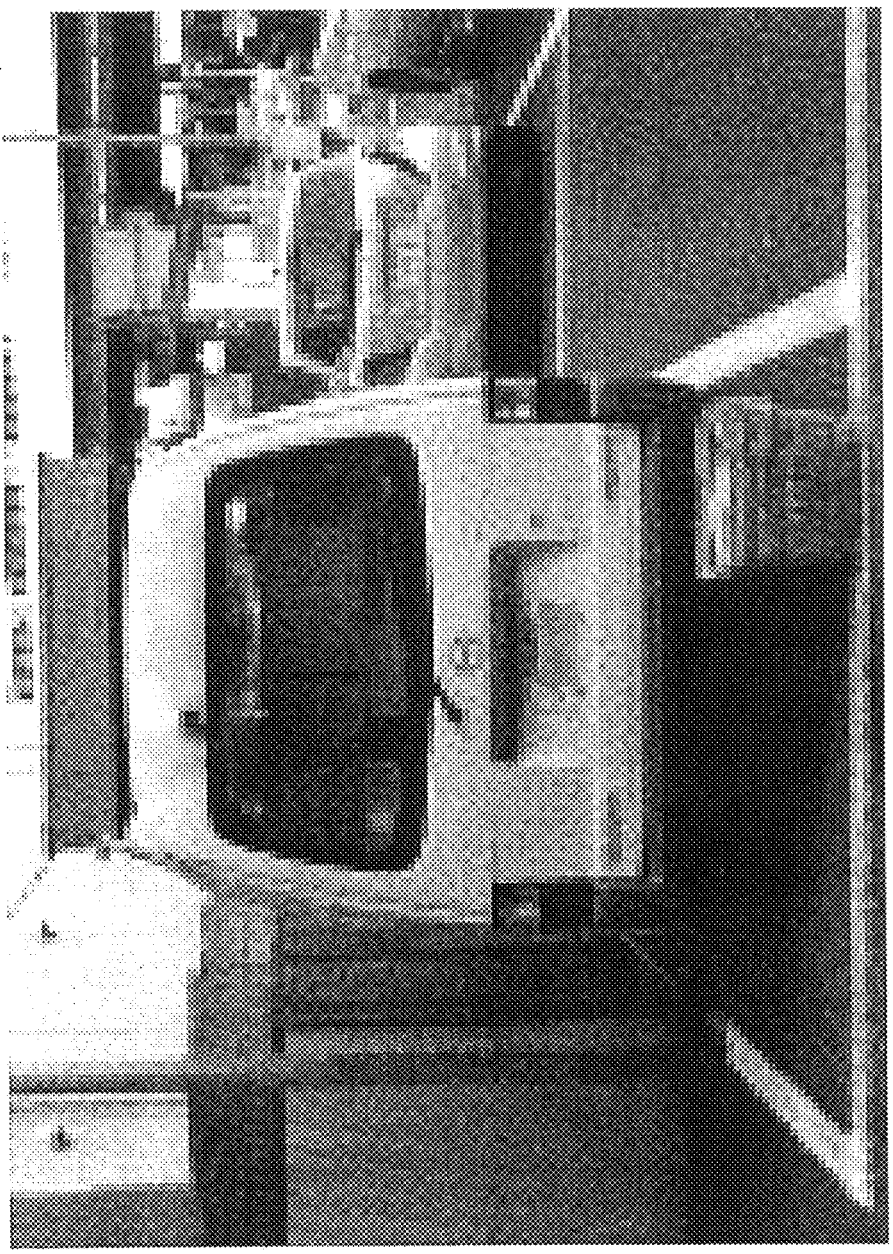
FIG. 4B shows a luminance image 102 generated by extracting a luminance component from the input image 101.

FIG. 4B shows a Y-image (luminance image) 102 obtained by the image input unit 21.

The color space conversion performed by the image input unit 21 should not be limited to the above-described process, but may be, for example, conversion from the RGB color space to another color space, such as the Lab color space and the YPbPr color space.

Alternatively, the luminance image 102 may be generated by using the G-signal of the RGB color space. For pixels having the R and B components, interpolation can generate the G signal.

The color space processing may be performed by using a memory (not shown) such as a frame memory that can store image signals.

The image feature quantity extraction unit 221 subjects the Y image (luminance image) 102 obtained by the image input unit 21 to the processing to calculate (extract) an image feature quantity. In the present embodiment, a physical quantity correlated with an edge component of luminance is used as an image feature quantity.

More specifically, the image feature quantity extraction unit 221 in the present embodiment subjects the luminance image 102 to an edge detection process to generate a feature-quantity extraction image (edge image) 103.

Figure 4C:
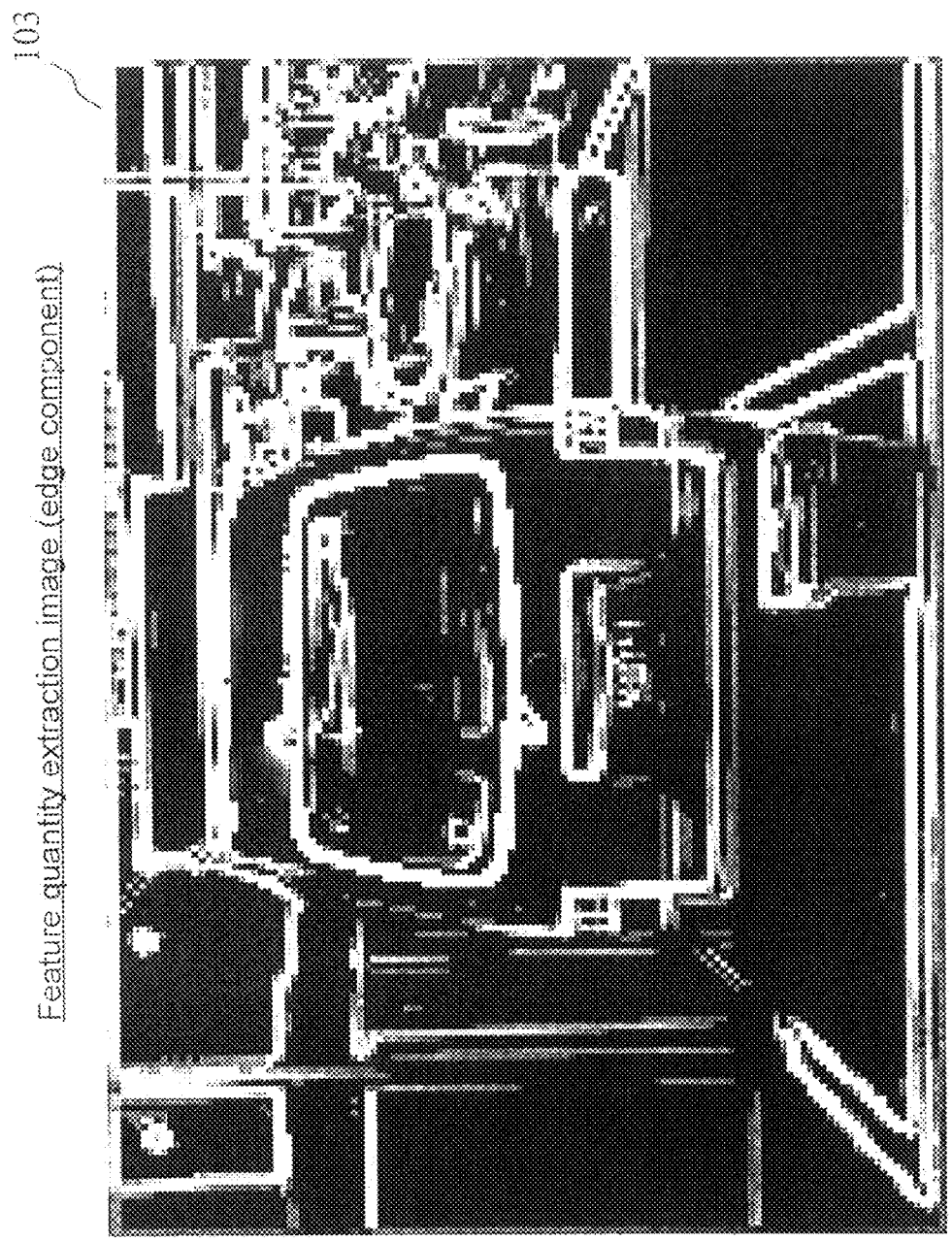
FIG. 4C shows an edge image 103 generated from the luminance image 102.

FIG. 4C shows a feature-quantity extraction image (edge image) 103 obtained by the image feature quantity extraction unit 221. The image feature quantity extraction unit 221 subjects the luminance image 102 to, for example, differential arithmetic processing (e.g., filtering using the Sobel filter) to generate the feature-quantity extraction image (edge image) 103.

Subsequently, the symmetry evaluation unit 222 evaluates the symmetry of the edge image 103 obtained by the image feature quantity extraction unit 221. A method for evaluating the symmetry will now be described.

1.2.1 Method for Evaluating Symmetry

Figure 5:
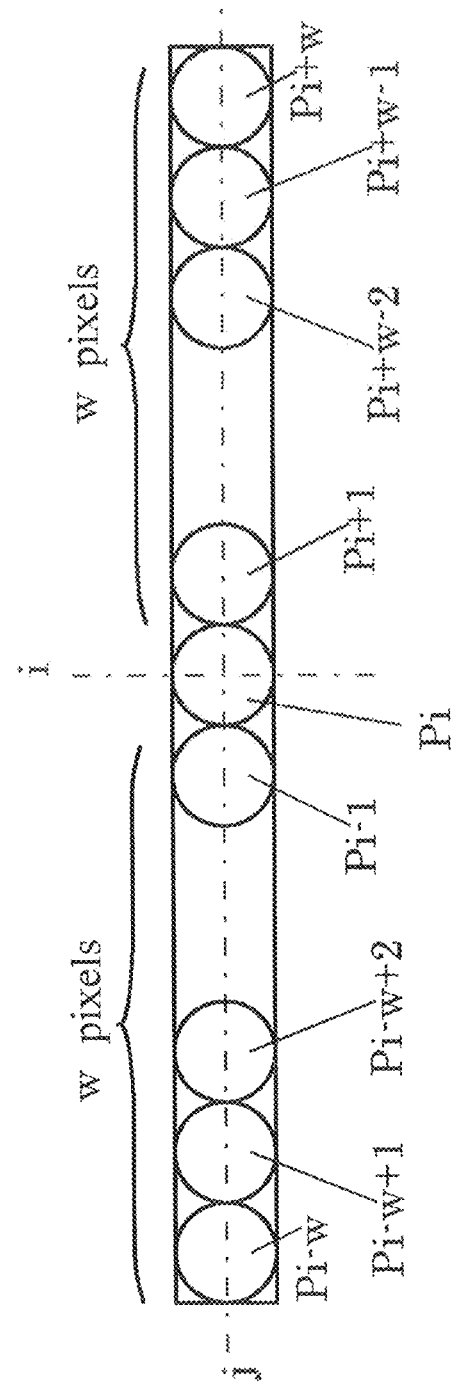
FIG. 5 is a diagram of pixels located right and left to a target pixel $P_i$.

The symmetry evaluation unit 222 evaluates the symmetry with respect to a target pixel $P_i$ shown in FIG. 5. The target pixel $P_i$ is a pixel included in the edge image 103. The target pixel $P_i$ is at the coordinates (i, j) in the edge image 103. The pixel $P_x$ hereafter refers to a pixel at the coordinates (x, j) in the edge image 103. More specifically, the pixel $P_x$ is in the x-th row in the horizontal direction and in the j-th column in the vertical direction. In the formula, $P_x$ is the pixel value of the pixel $P_x$. In the present embodiment, $P_x$ is a value ranging from 0 to 255. The value $P_x$ is larger as the image feature quantity (edge component quantity in the present embodiment) is larger (the degree of the target image feature quantity is higher).

FIG. 5 shows w pixels ($P_{i-w}$ to $P_{i-1}$), which are located left to the target pixel $P_i$, and w pixels ($P_{i+1}$ to $P_{i+w}$) (w is a natural number), which are located right to the target pixel $P_i$. The arithmetic operation corresponding to Formula 4 is used to evaluate the symmetry of the ($2_{w+1}$) pixels ($P_{i-w}$ to $P_{i+w}$).

Formula 4

$$SYM_w(i, j) = \frac{1}{w}\sum_{k=1}^{w} \{(255 - |P_{i-k} - P_{i+k}|) * P_{i-k} * P_{i+k}\} \quad (4)$$

In Formula 4, $SYM_w(i, j)$ is an evaluation value for the symmetry, and k is an integer ranging from 1 to w.

The pixel $P_{i-k}$ and the pixel $P_{i+k}$ are at positions symmetrical to each other with respect to the target pixel $P_i$. When the pixel $P_{i-k}$ and the pixels $P_{i+k}$ have the same pixel value, the difference between the pixels, or the value $|P_{i-k}-P_{i+k}|$, is a minimum value of 0. As a result, the value ($255-|P_{i-k}-P_{i+k}|$) is a maximum value of 255.

The evaluation value ($255-|P_{i-k}-P_{i+k}|$) is multiplied by the pixel values $P_{i-k}$ and $P_{i+k}$. As a result, the value is weighted by the image feature quantity of pixels located distant from the target pixel $P_i$ by k pixels to the right and to the left in the horizontal direction. This excludes pixels having small image feature quantities from the target pixels for symmetry evaluation. More specifically, when the feature-quantity extraction image is an edge image 103, the pixels $P_{i-k}$ and $P_{i+k}$, which do not form edges in the edge image 103, have a value close to 0. For areas that do not form edges, the resulting value ($255-|P_{i-k}-P_{i+k}|$)×$P_{i-k}$×$P_{i+k}$ would be close to 0.

In Formula 4, the evaluation value $SYM_w(i, j)$ is larger as the symmetry is higher for a target image feature quantity (an edge component quantity in this embodiment).

The symmetry evaluation unit 222 calculates the evaluation values $SYM_w(i, j)$ for each target pixel $P_i$ by varying the width w. The symmetry evaluation unit 222 calculates the maximum value maxSYM of the evaluation values $SYM_w(i, j)$ for the target pixel $P_i$ as given in Formula 5 below.

Formula 5 max SYM=max($SYM_1(i,j),SYM_2(i,j), \ldots ,$
$SYM_{N-1}(i,j),SYM_N(i,j)$) (5)

In Formula 5, N is a maximum value of the width w. The maximum value N is i−1 when the row value i, which indicates the horizontal position of the target pixel, is H/2 or less, where H is the number of pixels in the horizontal direction of the edge image 103. The maximum value N is H−i when the row value i indicating the horizontal position of the target pixel is greater than H/2.

In Formula 5, max( ) is a function to return a maximum value of an element. The processing written as Formula 5 yields the maximum value maxSYM as a maximum one of the values SYM1(i, j) to SYMN(i, j).

The symmetry evaluation unit 222 obtains the width w that returns the maximum value maxSYM as the symmetry width wa. More specifically, the evaluation value $SYM_w(i, j)$ is the maximum value maxSYM when w=wa. The maximum value maxSYM can be written as the formula below using the symmetry width wa.

maxSYM=SYMwa(i,j)

The processing written as Formula 4 and Formula 5 above will now be described with reference to FIGS. 6A-6F. FIGS. 6A to 6F are schematic diagrams showing examples of feature-quantity extraction images, which are obtained by extracting feature quantities from a captured image of a horizontally symmetrical object having an axis C1 serving as the axis of symmetry. In FIGS. 6A to 6F, an area R1 is a target area for the calculation corresponding to Formula 4. For ease of explanation, each pixel included in white portions in FIG. 6A to 6F is assumed to have an image feature quantity (pixel value) $P_x$ of 255, whereas each pixel included in black portions is assumed to have an image feature quantity $P_x$ of 0. The case of performing processing with coefficient adjustment written as Formula 6 below to allow the value of $SYM_w(i,j)$ to fall within a range from 0 to 255 will now be described.

In FIGS. 6A to 6F, the proportion of pixels having an image feature quantity (pixel value) $P_x$ of 255 in the area R1 is calculated in the manner described below.

Figure 6:
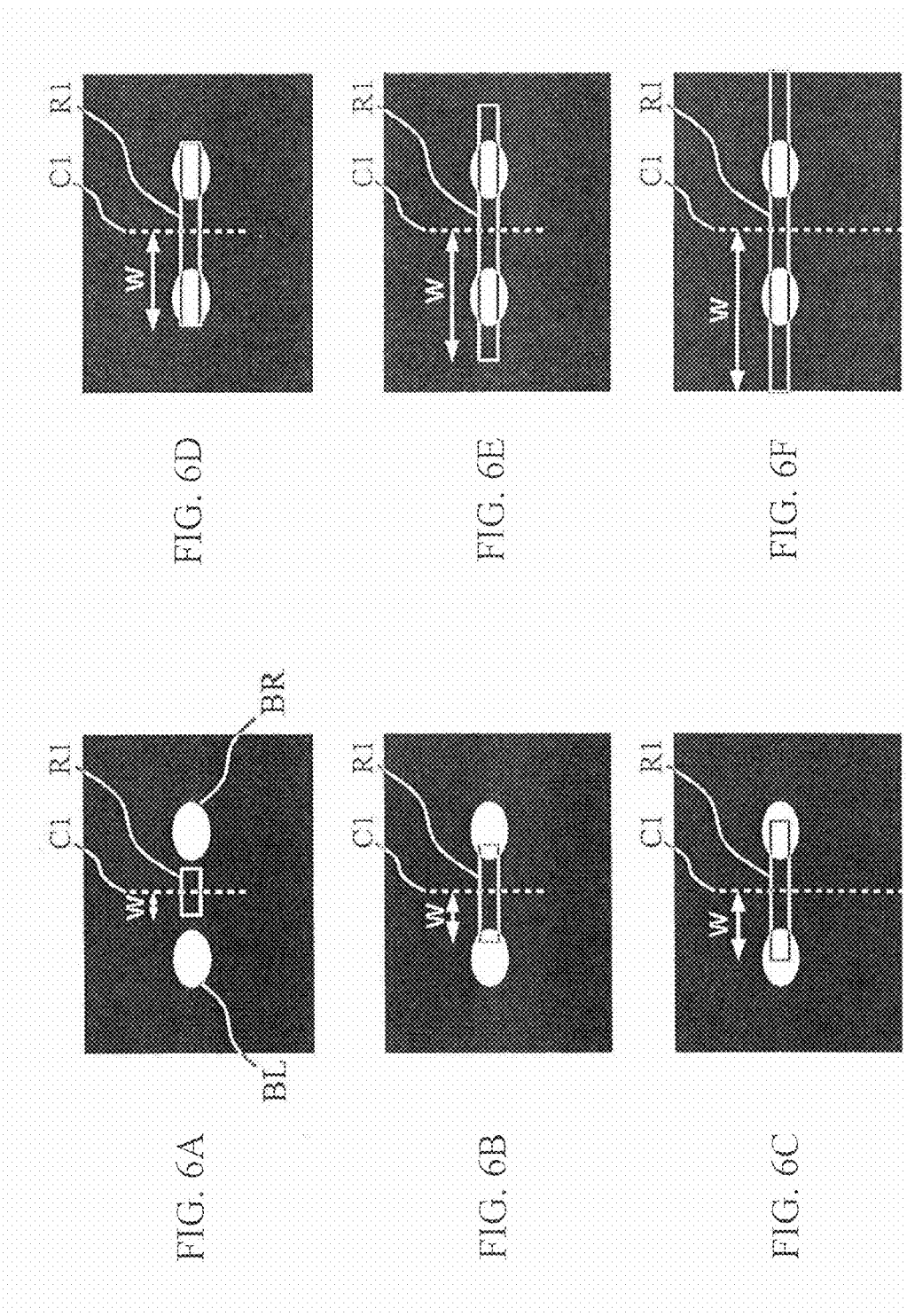
FIGS. 6A-6F are diagrams describing a method for obtaining a symmetry width wa.

In the example of FIG. 6A, the proportion of pixels having an image feature quantity (pixel value) $P_x$ of 255 in the area R1 is 0.0.

In the example of FIG. 6B, the proportion of pixels having an image feature quantity (pixel value) $P_x$ of 255 in the area R1 is 0.2.

In the example of FIG. 6C, the proportion of pixels having an image feature quantity (pixel value) $P_x$ of 255 in the area R1 is 0.4.

In the example of FIG. 6D, the proportion of pixels having an image feature quantity (pixel value) $P_x$ of 255 in the area R1 is 0.6.

In the example of FIG. 6E, the proportion of pixels having an image feature quantity (pixel value) $P_x$ of 255 in the area R1 is 0.4.

In the example of FIG. 6F, the proportion of pixels having an image feature quantity (pixel value) $P_x$ of 255 in the area R1 is 0.3.

Formula 6

$$SYM_w(i, j) = \frac{1}{w}\sum_{k=1}^{w} \left\{(255 - |P_{i-k} - P_{i+k}|) * \frac{P_{i-k}}{255} * \frac{P_{i+k}}{255}\right\} \quad (6)$$

In the example of FIG. 6A, each pixel included in the calculation target area R1 has an image feature quantity (pixel value) of 0. Thus, $SYM_W(i, j)$ is calculated as $SYM_W(i, j)$=0 using Formula 6.

In the example of FIG. 6B, the proportion of pixels having an image feature quantity (pixel value) of 255 in the calculation target area R1 is 0.2. In this case, the value $SYM_W(i, j)$ is calculated in the manner described below using Formula 6.

$SYM_W(i, j)$=0.2×255.

In the example of FIG. 6C, the proportion of pixels having an image feature quantity (pixel value) of 255 in the calculation target area R1 is 0.4. Thus, the value of $SYM_W(i, j)$ is determined as described below using Formula 6.

$SYM_W(i, j)$=0.4×255.

In the example of FIG. 6D, the proportion of pixels having an image feature quantity (pixel value) of 255 in the calculation target area R1 is 0.6. Thus, the value of $SYM_W(i, j)$ is determined as described below using Formula 6.

$SYM_W(i, j)$=0.6×255.

In the example of FIG. 6E, the proportion of pixels having an image feature quantity (pixel value) of 255 in the calculation target area R1 is 0.4. Thus, the value of $SYM_W(i, j)$ is determined as described below using Formula 6.

$SYM_W(i, j)$=0.4×255.

In the example of FIG. 6F, the proportion of pixels having an image feature quantity (pixel value) of 255 in the calculation target area R1 is 0.3. Thus, the value of $SYM_W(i, j)$ is determined as described below using Formula 6.

$$SYM_W(i, j) = 0.3 \times 255.$$

As described above, with the $SYM_W(i, j)$ being a maximum value in the state shown in FIG. 6D, the evaluation value $SYM_W(i, j)$ in the state shown in FIG. 6D (=0.6×255) is the maximum value maxSYM, and the corresponding width w (w in the state shown in FIG. 6D) is used as the symmetry width wa. In other words, the proportion of pixels having an image feature quantity (pixel value) of 255 in the state shown in FIG. 6D is maximum. Thus, in processing the feature-quantity extraction images shown in FIGS. 6A-6F, the symmetry evaluation unit 222 obtains the evaluation value $SYM_W(i, j)$ (=0.6×255) in the state shown in FIG. 6D as the value maxSYM. The symmetry evaluation unit 222 obtains the width w in this state (w in the state shown in FIG. 6D) as the symmetry width wa.

The symmetry evaluation unit 222 performs the processing written as Formulae 4 and 5 for each of all the target pixels for which symmetry is to be evaluated, and generates (obtains) (1) symmetry evaluation map data showing the correspondence between each processing target pixel and the corresponding value maxSYM (or a value correlated with the value maxSYM), and (2) symmetry width map data showing the correspondence between each processing target pixel and the corresponding symmetry width wa (the width w that returns the maximum value maxSYM) (or a value correlated with the symmetry width wa).

Figure 4D:
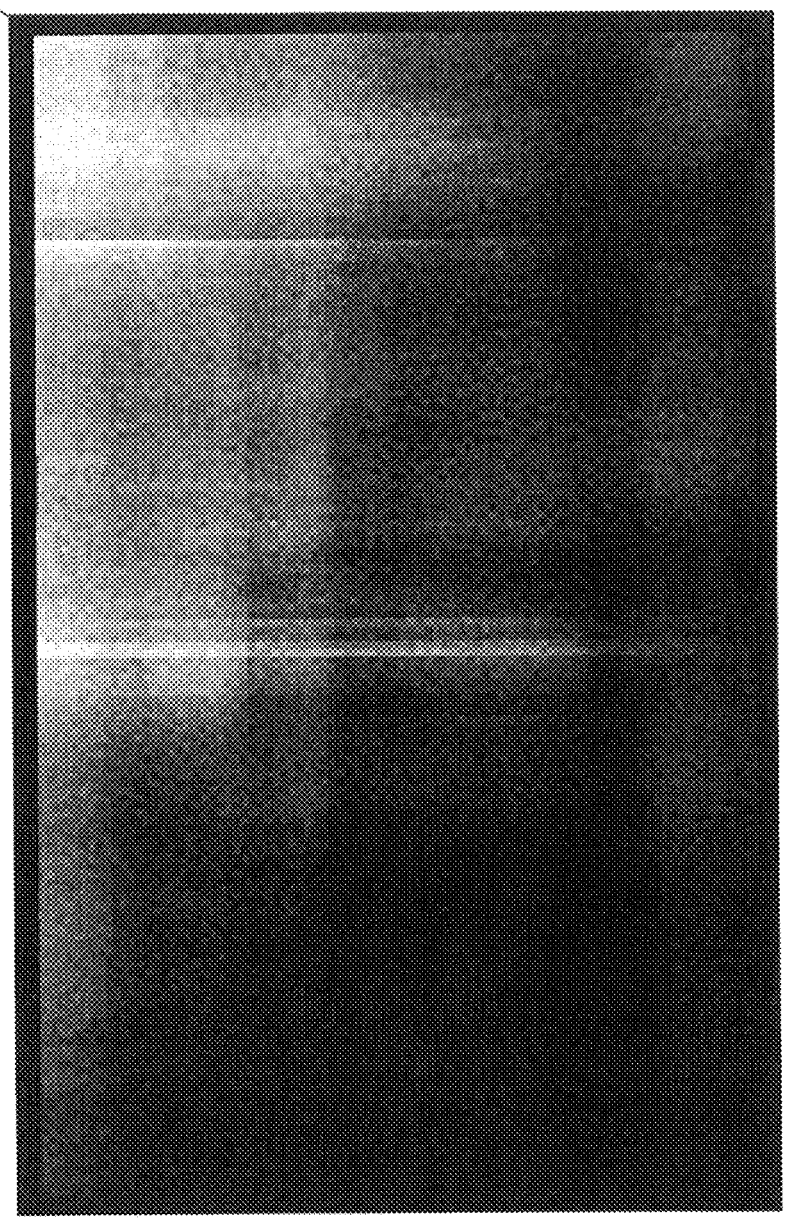
FIG. 4D shows a symmetry evaluation map image 104.

FIG. 4D shows a symmetry evaluation map image 104 obtained from the symmetry evaluation map data. The symmetry evaluation map image 104 is an image in which each pixel has the corresponding value maxSYM (or a value correlated with the value maxSYM) as its pixel value.

Figure 4E:
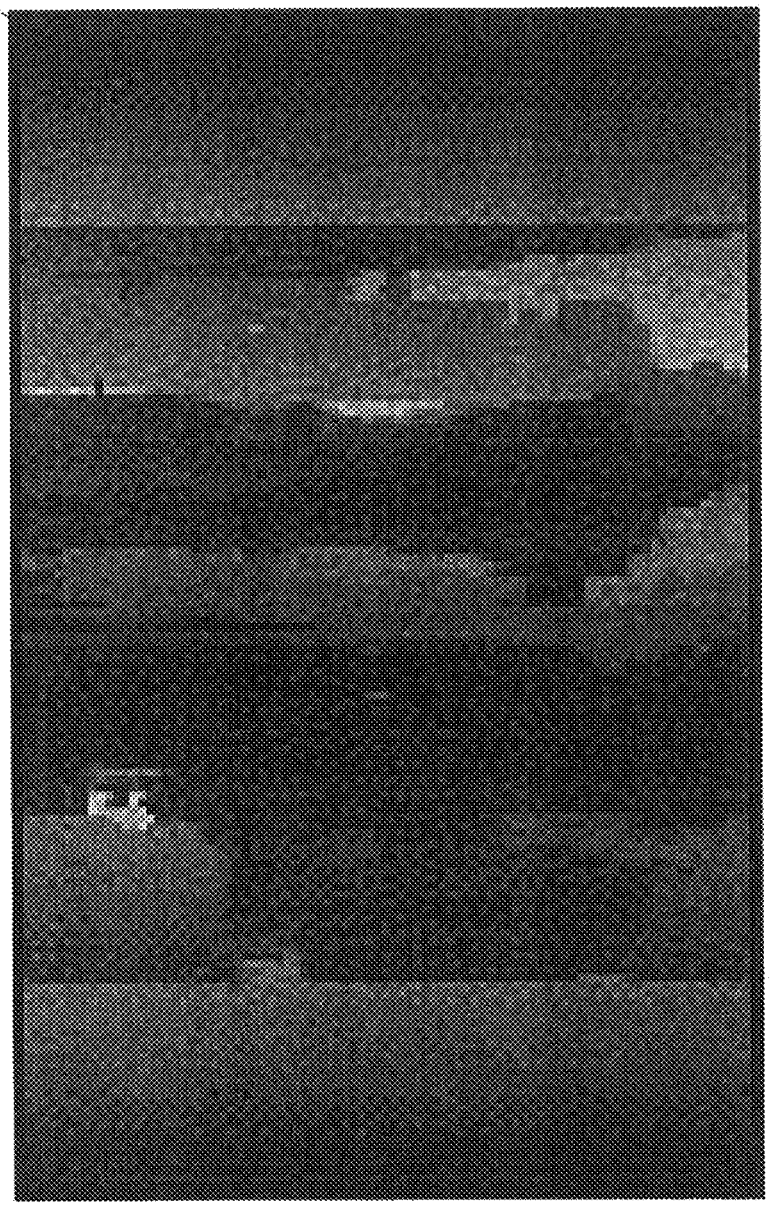
FIG. 4E shows a symmetry width map image 105.

FIG. 4E shows a symmetry width map image 105 obtained from the symmetry width map data. The symmetry width map image 105 is an image in which each pixel has the corresponding symmetry width wa (the width w that returns the maximum value maxSYM) (or a value correlated with the symmetry width wa) as its pixel value.

In the present embodiment, the symmetry evaluation unit 222 uses each of all pixels forming the edge image 103 as a target pixel for which symmetry is to be evaluated (evaluation target pixel). In other words, the symmetry evaluation unit 222 calculates the value $SYM_W(i, j)$ for each of all pixels included in the edge image 103, and then calculates the corresponding maximum value maxSYM.

To reduce the arithmetic processing or to improve the processing speed, the symmetry evaluation unit 222 may use selected pixels in the edge image 103 (thinning of pixels) and perform the same processing as described above to obtain the symmetry evaluation map data and the symmetry width map data. For example, the symmetry evaluation unit 222 may use only pixels in odd-numbered lines or pixels in even-numbered lines in the horizontal (or vertical) direction as pixels for which symmetry is to be evaluated (evaluation target pixels). Alternatively, the symmetry evaluation unit 222 may use fewer pixels, or pixels selected at every three lines, as evaluation target pixels.

The symmetry evaluation map data is map data having the value maxSYM (or a value correlated with the value maxSYM) calculated for each evaluation target pixel as its map element. The symmetry evaluation map data can also be seen as an image in which each evaluation target pixel has its corresponding calculated maximum value maxSYM (or a value correlated with the value maxSYM) as the pixel value. FIG. 4D shows an image representing the symmetry evaluation map data (the symmetry evaluation map image 104). The symmetry evaluation unit 222 only needs to obtain the value maxSYM calculated for each evaluation target pixel (or a value correlated with the value maxSYM). The symmetry evaluation unit 222 may not obtain the image (the symmetry evaluation map image 104) in the format shown in FIG. 4D. The symmetry evaluation unit 222 only needs to obtain data showing the correspondence between each evaluation target pixel and its maximum value maxSYM.

The present embodiment uses each of all pixels forming the edge image 103 as an evaluation target pixel. In this case, the symmetry evaluation map image 104 is a grayscale image in which the pixel value of each of all the pixels of the edge image 103 is replaced with the corresponding value maxSYM (or a value correlated with the value maxSYM).

The value $SYM_w(i, j)$ calculated by Formula 4 above can be 24-bit data. Although the symmetry evaluation map image 104 may use the maximum value maxSYM directly as the pixel value of each pixel, the symmetry evaluation map image 104 may be an image obtained through dynamic range conversion. More specifically, dynamic range conversion may be performed to adjust the range of values maxSYM, which is defined by a minimum value to a maximum value of the values maxSYM calculated for an input image of one frame, to, for example, the range of 0 to 255 (the 8-bit range) (the processing may be other processing, such as normalization, clipping to a predetermined value, or gain adjustment such as the processing written as Formula 6).

When the value $SYM_w(i, j)$ is adjusted to fall within the range of 0 to 255, each element of the symmetry evaluation map image 104 can have a value within the range of 0 to 255. In FIG. 4D, a color closer to white indicates a larger value $SYM_w(i, j)$ (a value closer to 255). More specifically, in FIG. 4D, a color closer to white represents an area evaluated to have high symmetry, indicating that the area is near the center of a symmetrical object. In FIG. 4D, a color closer to black represents an area having low symmetry. The dynamic range conversion described above is a mere example. Other dynamic range conversion may be performed to convert the value $SYM_w(i, j)$ into a range other than the range of 0 to 255.

The symmetry evaluation unit 222 generates (obtains) the symmetry width map data for all evaluation target pixels for which symmetry is to be evaluated. The symmetry width map data is map data having the symmetry width wa that returns the maximum value maxSYM for each evaluation target pixel as its map element. The symmetry width map data can also be seen as an image in which each evaluation target pixel has the corresponding symmetry width wa as its pixel value. FIG. 4E shows an image representing the symmetry width map data (the symmetry width map image 105). The present embodiment uses each of all pixels forming the edge image 103 as an evaluation target pixel. In this case, the symmetry width map image 105 is a grayscale image in which the pixel value of each of all the pixels of the edge image 103 is replaced with the corresponding symmetry width wa.

As described above in the present embodiment, the symmetry width wa can be a value ranging from 1 to N. In this case, each element of the symmetry width map image 105 can be a value ranging from 1 to N. The value N differs depending on the pixel position. In FIG. 3E, a color closer to white indicates an area with a larger symmetry width wa. In FIG. 3E, a color closer to black indicates an area with a smaller symmetry width wa.

Subsequently, the center detection unit 223 refers to the symmetry evaluation map data (symmetry evaluation map image 104) generated by the symmetry evaluation unit 222, and generates symmetry center map data (symmetry center map image 106). The center detection unit 223 determines (estimates) a pixel corresponding to a maximum local point of the values maxSYM (or a group of pixels around the maximum local point) for each horizontal line in the symmetry evaluation map image 104.

Figure 7:
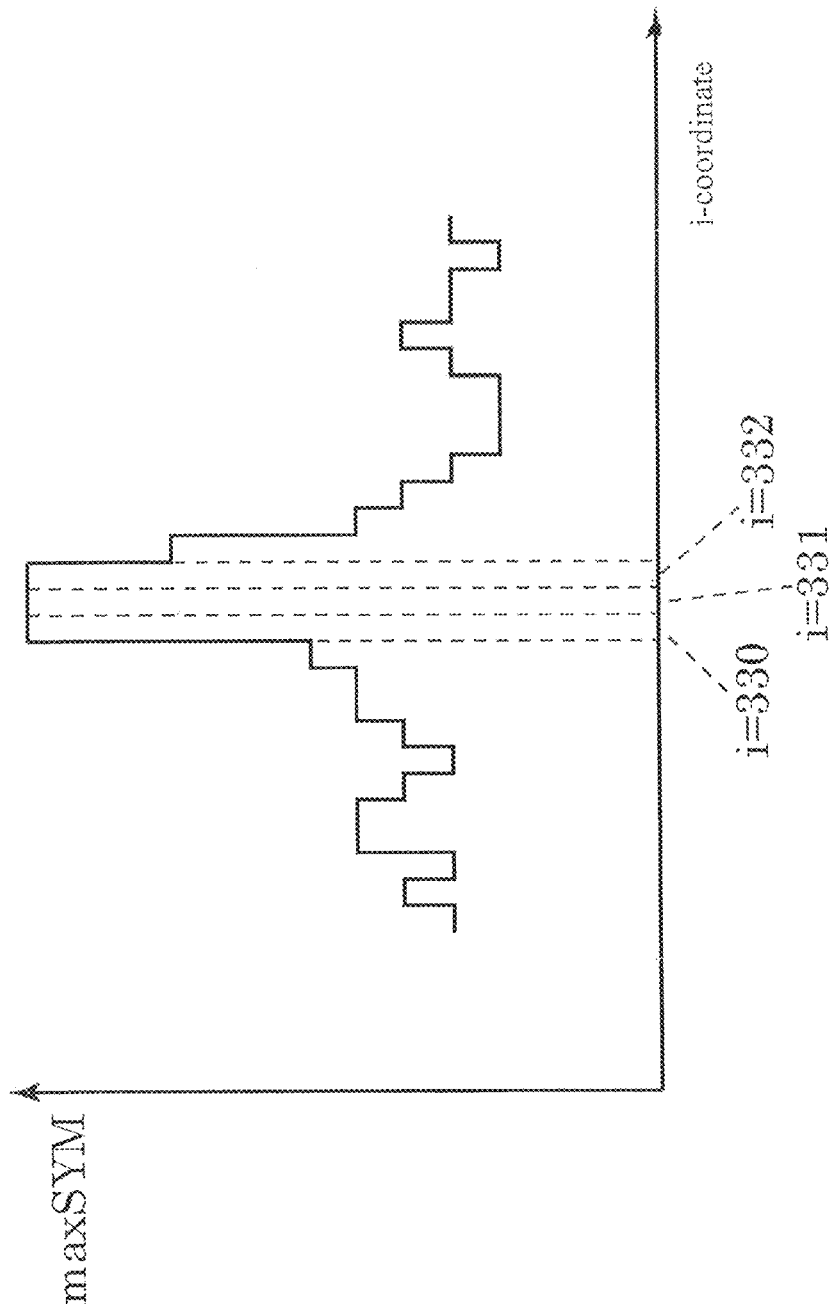
FIG. 7 is a graph showing (example) changes in the symmetry evaluation map image 104 in the horizontal direction.

FIG. 7 is a graph showing changes in the symmetry evaluation map image 104 in the horizontal direction. More specifically, FIG. 7 shows the changing values maxSYM for one horizontal line of the symmetry evaluation map image 104.

In FIG. 7, three pixels in rows 330 to 332 in the horizontal direction (i coordinates) (pixels at i=330, i=331, and i=332) have local maximum symmetry evaluation values (values maxSYM). In this case, the center detection unit 223 determines that three pixels at i=330, 331, and 332 correspond to a local maximum point (or an area around a local maximum point) of the symmetry evaluation values (values maxSYM) for one horizontal line shown in FIG. 7.

In the same manner, the center detection unit 223 identifies (estimates) an area (a pixel or a group of pixels) corresponding to a local maximum point (or an area around a local maximum point) for each of all horizontal lines. The area identified (estimated) by the center detection unit 223 is referred to as a "symmetry center pixel area."

Figure 4F:
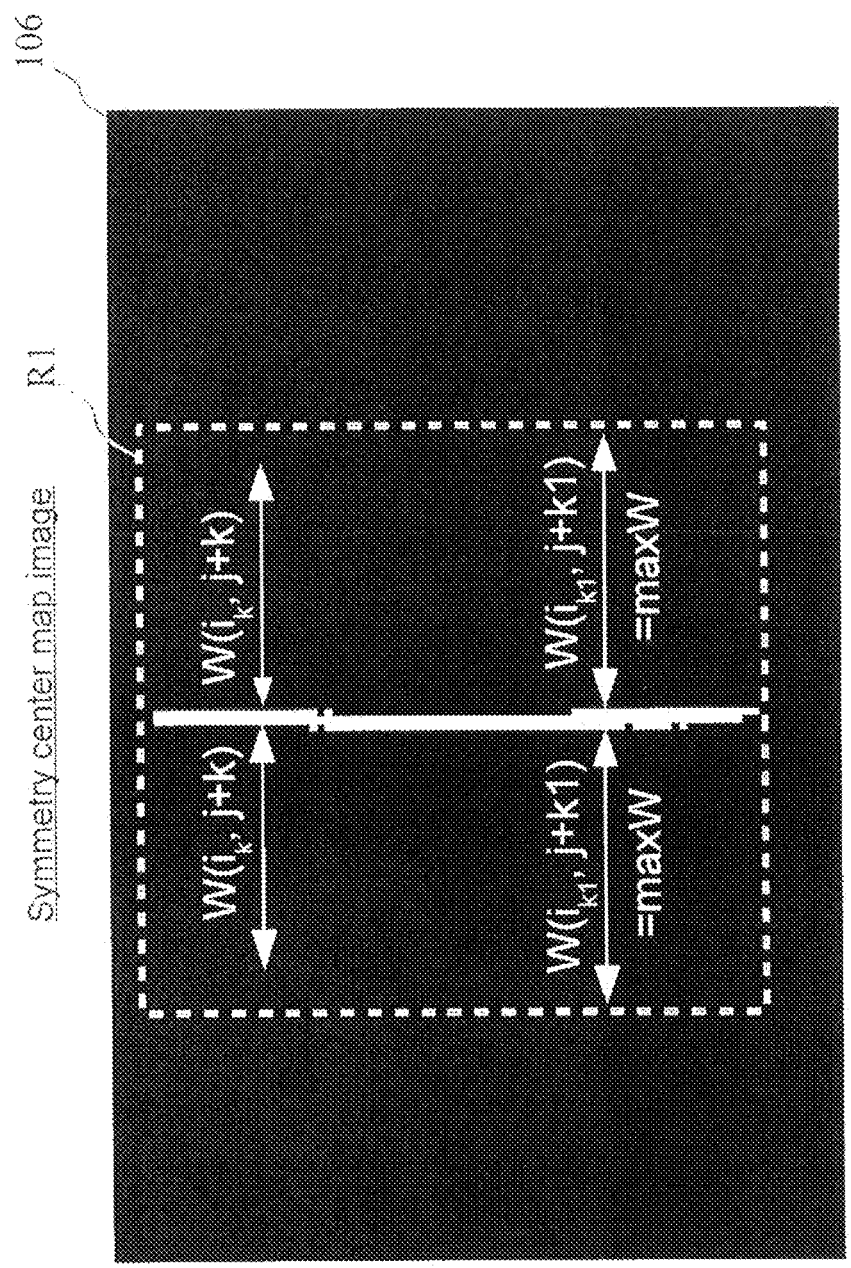
FIG. 4F shows a symmetry center map image 106.
Figure 4G:
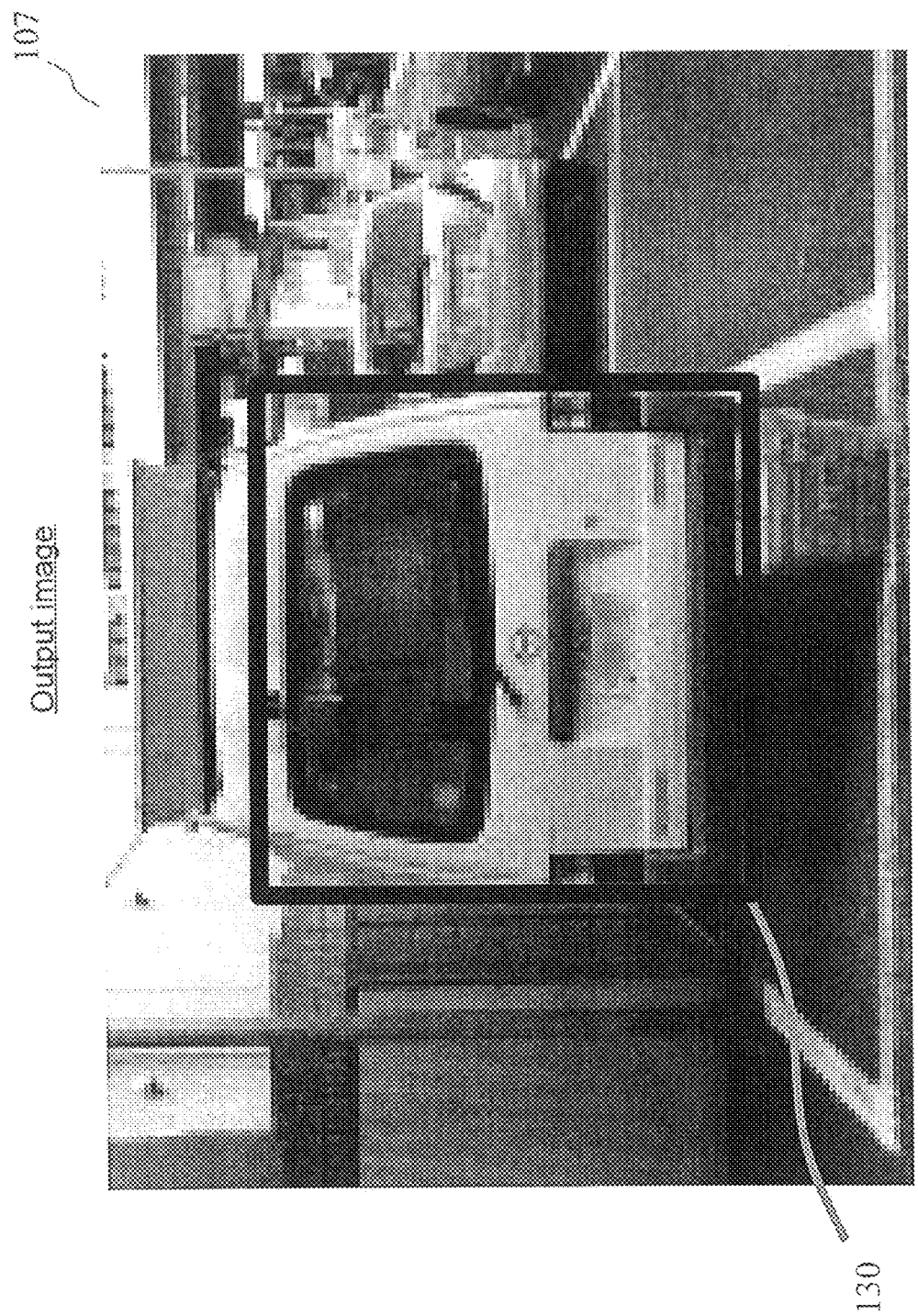
FIG. 4G shows a composite image (output image) 107 including a superimposed area frame 130.

FIG. 4F shows a symmetry center map image 106 indicating a symmetry center pixel area identified (estimated) by the center detection unit 223. The symmetry center map image 106 is seen as an image in which, for example, a pixel determined to be within a symmetry center pixel area has an element (pixel value) of 1 and a pixel determined not to be within the symmetry center pixel area has an element (pixel value) of 0. In FIG. 4F, a white portion indicates a pixel determined to form the symmetry center pixel area.

The determination as to whether a processing target pixel (target pixel) forms the symmetry center pixel area may be accompanied by, for example, the processing described below.

(1) The pixel value of each pixel forming the symmetry evaluation map image 104 is compared with a predetermined threshold. The pixel is determined to be a candidate for a local maximum point only when the pixel value exceeds the threshold.

(2) The symmetry evaluation map image 104 is subjected to smoothing in the horizontal direction (a processing target horizontal line is subjected to smoothing). After smoothing, the resulting image is used to identify the position of the local maximum point (the horizontal position).

This eliminates local maximum points resulting from minor variations, and thus yields a highly accurate symmetry center map image.

Subsequently, the object area detection unit 224 detects the horizontal width and the vertical width of a symmetrical object included in the input image.

The object area detection unit 224 detects the horizontal width of the object using the symmetry center map data (the symmetry center map image 106) and the symmetry width map data (the symmetry width map image 105).

More specifically, the object area detection unit 224 detects the horizontal width of an object through, for example, the processing (1) to (5) described below. For ease of explanation, a horizontal line including the first pixel having a pixel value of 1 in the symmetry center map image 106 is referred to as the j-th horizontal line.

(1) In the symmetry center map image 106, a pixel forming the central axis of a symmetrical object is given a pixel value of 1. Thus, the object area detection unit 224 extracts a pixel having a pixel value of 1 from the symmetry center map image 106, and obtains the symmetry width of the extracted pixel from the symmetry width map image 105.

(1A):

When a single pixel having a pixel value of 1 is detected in the horizontal direction (without a sequence of pixels being detected in the horizontal direction), the object area detection unit 224 extracts the symmetry width $W(i, j)$ of the extracted single pixel having the pixel value of 1 (the pixel is at the coordinates $(i, j)$) from the symmetry width map data.

(1B):

When a plurality of pixels having a pixel value of 1 are sequentially detected in the horizontal direction, the average of the symmetry width values for the plurality of pixels (sequential pixels in the horizontal direction) is used as the symmetry width. In one example, three pixels at the coordinates $(i-1, j)$, $(i, j)$, and $(i+1, j)$ each having a pixel value of 1 have the symmetry width values $W(i-1, j)$, $W(i, j)$, and $W(i+1, j)$, respectively. In this case, the symmetry width $W(i, j)$ can be calculated in the manner described below.

$$W(i,j)=\text{AVRG}(W(i-1,j),W(i,j),W(i+1,j)), \text{ or}$$

$$W(i,j)=\text{MAX}(W(i-1,j),W(i,j),W(i+1,j)).$$

In these formulae, AVRG( ) is a function to return the average for an element, and MAX( ) is a function to return a maximum value of an element.

The symmetry width $W(i, j)$ calculated for the j-th horizontal line through the processing (1A) or (1B) is referred to as $W(i0, j)$.

(2) When, for example, the (j+1)th horizontal line includes a pixel having a pixel value of 1 substantially at the same position as the pixel extracted through the processing (1) in the horizontal direction (e.g., a pixel located at coordinates within the range of $(i-a, j+1)$ to $(i+a, j+1)$, where "a" is a predetermined threshold used to determine whether the positions in the horizontal direction are substantially the same), the symmetry width of the pixel is extracted from the symmetry width map data in the same manner as with the processing (1).

When the pixel $(i_1, j+1)$ has a pixel value of 1 (or the pixel is at the central position in the sequence of pixels having a pixel value of 1 in the horizontal line), the object area detection unit 224 calculates the symmetry width $W(i_1, j)$ of the pixel $(i_1, j+1)$ in the same manner as with the processing (1).

(3) For the (j+2)th and subsequent horizontal lines, the same processing as described above is repeated.

The above processing is repeated until the horizontal line includes no pixel having a pixel value of 1 substantially at the same position as the pixel extracted through the processing (1) in the horizontal direction (e.g., a pixel located at coordinates within the range of $(i-a, j+1)$ to $(i+a, j+1)$, where "a" is a predetermined threshold used to determine whether the horizontal positions are substantially the same).

(4) The object area detection unit 224 calculates a maximum value maxW of the symmetry width calculated through the processing (1) to (3) described above. More specifically, the object area detection unit 224 performs the processing written as Formula 7 below to calculate the maximum value maxW of the symmetry width.

In Formula 7, the j-th to (j+m−1)th horizontal lines each include a pixel having a pixel value of 1 at substantially the same position as the pixel extracted with the processing (1) in the horizontal direction (e.g., a pixel located at coordinates within the range of $(i-a, j+1)$ to $(i+a, j+1)$, where "a" is a predetermined threshold used to determine whether the horizontal positions are substantially the same).

Formula 7

$$\max W = \max(W(i_0, j), W(i_1, j+1), \ldots, W(i_{m-2}, j+m-2), W(i_{m-1}, j+m-1)) \quad (7)$$

(5) The object area detection unit 224 detects the maximum value maxW of the calculated symmetry width values as the width of the object (the distance from the center of the object in the horizontal direction to one end of the object). In FIG. 4F, the symmetry width is at the maximum in the (j+k1)th horizontal line. In other words, maxW=W($i_{k1}$, j+k1) in this example.

The object area detection unit 224 detects the width of the object in the vertical direction using the width (length) of the symmetry center pixel area in the vertical direction. More specifically, the object area detection unit 224 identifies the upper end of symmetry center pixels arranged sequentially in the vertical direction as the upper end of the object, and identifies the lower end of the symmetry center pixels arranged sequentially in the vertical direction as the lower end of the object.

As shown in FIG. 4F, the object area detection unit 224 determines (identifies) an area R1 defined as a rectangular area with the upper left vertex at the coordinates ($i_{k1}$−maxW, j) and the lower right vertex at the coordinates ($i_{k1}$+maxW, j+m−1) as an image area corresponding to a highly symmetrical object when, for example, the upper end of symmetry center pixels arranged sequentially in the vertical direction is in the j-th horizontal line, the lower end of symmetry center pixels arranged sequentially in the vertical direction is in the (j+m−1)th horizontal line, and the central position of the pixels in the horizontal line corresponding to the value maxW (=W($j_{k1}$, j+k1)) is at the coordinates ($i_{k1}$, j+k1 ).

The object area detection unit 224 outputs information indicating an image area corresponding to the identified object (the highly symmetrical object) (information identifying the area R1, or for example information indicating the coordinates of the rectangular area) to the superimposing unit 23.

Although the above embodiment describes the case in which the object area detection unit 224 identifies the image area corresponding to the highly symmetrical object using a rectangular area, the embodiment should not be limited to this structure. For example, the object area detection unit 224 may identify an image area corresponding to a highly symmetrical object based on a symmetry width extracted for each horizontal line from the symmetry width map data. In this case, the object area detection unit 224 identifies an area that extends to the right and to the left of the symmetry center pixel (the pixel included in the symmetry center pixel area) each by a length corresponding to the symmetry width for each horizontal line and determines the identified area as an image area corresponding to the highly symmetrical object. The resulting image area corresponding to the highly symmetrical object has substantially the same shape as the highly symmetrical object (e.g., the image area is shaped substantially in conformance with the contour of the vehicle 110 shown in FIG. 4A).

The superimposing unit 23 generates (superimposes) an image indicating an image area corresponding to the highly symmetrical object on the image output from the image input unit 21 (input image 101) based on information identifying an image area corresponding to the detected highly symmetrical object output from the object area detection unit 224. The superimposing unit 23 generates (superimposes) an image in which, for example, a rectangular frame indicating the image area corresponding to the highly symmetrical object appears on the image output from the image input unit 21. The superimposing unit 23 then outputs the resulting composite image to the display apparatus 3.

The display apparatus 3 displays the image indicating the image area corresponding to the highly symmetrical object output from the superimposing unit 23 of the object detection apparatus 2. FIG. 3G shows a composite image 107 in which the area frame 130 indicating the area of the vehicle 110, which is a symmetrical object, is superimposed on the input image 101. When the width of the object is determined for each horizontal direction line, the area frame would not be rectangular but would be shaped in conformance with the contour of the object (shaped substantially in conformance with the contour of the vehicle 110).

As described above, the object detection system 1000 of the present embodiment evaluates the symmetry of an image obtained by extracting an image feature quantity from the input image (captured image) by varying the width (width in the predetermined direction, which is for example the horizontal direction) to evaluate the symmetry of the image in the predetermined direction (horizontal direction). As a result, when the object detection system 1000 of the present embodiment determines that a predetermined image area has high symmetry, the object detection system 1000 can simultaneously obtain the width in the predetermined direction (horizontal direction) of the image area for which the symmetry is high. In other words, the object detection system 1000 of the present embodiment can extract the position and the size of an object at one time using the symmetry of the object included in the image.

The object detection system 1000 of the present embodiment can detect the central axis of a highly symmetrical object using evaluation data for symmetry in a predetermined direction (horizontal direction). The object detection system 1000 of the present embodiment can thus detect a highly symmetrical object with high accuracy using less arithmetic processing.

First Modification

A first modification of the present embodiment will now be described.

An object detection system according to this modification has the same structure as described in the first embodiment. The modification will be described focusing on its differences from the first embodiment. The components that are the same as in the first embodiment are given the same reference numerals as those embodiments and will not be described in detail.

The symmetry evaluation unit 222 in this modification performs the processing written as Formula 8 instead of Formula 4 described above. Formula 4 uses an image area of one horizontal line as an area for which a symmetry evaluation value is to be calculated. Formula 8 uses an image area of 2n+1 horizontal lines (2n+1 horizontal lines including a central horizontal line with the target pixel) as an area for which a symmetry evaluation value is to be calculated.

More specifically, the symmetry evaluation unit 222 of this modification calculates a symmetry evaluation value for each of the 2n+1 horizontal lines using Formula 8. The symmetry evaluation unit 222 accumulates the symmetry evaluation values calculated for the horizontal lines, and divides the accumulated value by the number of horizontal lines to obtain the average. The symmetry evaluation unit 222 uses the obtained average as the symmetry evaluation value $SYM_w$(i, j) of the target pixel (i, j). In Formula 8, $P_{x,y}$ indicates an image feature quantity (pixel value) at coordinates (x, y) in a feature-quantity extraction image (the same applies hereafter).

Formula 8

$$SYM_w(i, j) = \frac{1}{2n+1} \sum_{m=j-n}^{j+n} \left[ \frac{1}{w} * \sum_{k=1}^{w} \{(255 - |P_{i-k,m} - P_{i+k,m}|) * P_{i-k,m} * P_{i+k,m}\} \right] \quad (8)$$

As written in Formula 8, the symmetry evaluation unit 222 calculates a symmetry evaluation value by setting the vertical width of a target area for which a symmetry evaluation value is to be calculated as the width corresponding to the 2n+1 horizontal lines in total, which includes n lines located above the horizontal line including the target pixel and n lines located below the horizontal line including the target pixel. When the target pixel is around the upper end or the lower end of an image, and fewer than n lines are above the horizontal line including the target pixel or fewer than n lines are below the horizontal line including the target pixel, the width of the target area for which a symmetry evaluation value is to be calculated in the vertical direction may be changed. When, for example, the target pixel is close to the upper end, and n1 lines (n1<n) (from the upper end of the image) are above the horizontal line including the target pixel, an area including (n1+n+1) lines from the (j−n1)th line to the (j+n)th line may be set as the target area for which a symmetry evaluation value is to be calculated.

The symmetry evaluation unit 222 of this modification performs the processing written as Formula 8 as in the above embodiments to obtain the width w that returns the maximum value maxSYM as the symmetry width wa.

The center detection unit 223, the object area detection unit 224, and the superimposing unit 23 perform the same processing as described in the above embodiments.

As described above, in the object detection system of the present modification, the symmetry evaluation unit 222 calculates a symmetry evaluation value for each of the 2n+1 horizontal lines using Formula 8. The symmetry evaluation unit 222 then accumulates the symmetry evaluation values calculated for the horizontal lines, and divides the accumulated value by the number of horizontal lines to obtain the average, and uses the obtained average as the symmetry evaluation value $SYM_w(i, j)$ of the target pixel (i, j). In other words, the object detection system of the present modification uses an image area having a predetermined width in the vertical direction as a target for symmetry evaluation, and thus detects an area having high correlation in the vertical direction (e.g., a rectangular object having sides parallel to the symmetrical axis or the central axis) with high accuracy.

The symmetry evaluation unit 222 may calculate the symmetry evaluation value $SYM_w(i, j)$ using Formula 9 instead of Formula 8.

Formula 9

$$SYM_w(i, j) = \frac{1}{w} \sum_{k=1}^{w} \left[ \left( 255 - \frac{1}{2n+1} \left| \sum_{m=j-n}^{j+n} P_{i-k,m} - \sum_{m=j-n}^{j+n} P_{i+k,m} \right| \right) * \left( \frac{1}{2n+1} \sum_{m=j-n}^{j+n} P_{i-k,m} \right) * \left( \frac{1}{2n+1} \sum_{m=j-n}^{j+n} P_{i+k,m} \right) \right] \quad (9)$$

In the processing written as Formula 8, the symmetry evaluation unit 222 first evaluates symmetry in the horizontal direction, and then accumulates the symmetry evaluation values in the vertical direction and calculates the average of the accumulated values to obtain the symmetry evaluation value $SYM_w(i, j)$ of the target pixel (i, j).

In the processing in Formula 9, the symmetry evaluation unit 222 first performs the processing of accumulating values of each term in the vertical direction (average value calculation), and then evaluates symmetry in the horizontal direction to calculate the symmetry evaluation value $SYM_w(i, j)$ of the target pixel (i, j).

The symmetry evaluation unit 222 performs the processing written as Formula 9 to obtain the same processing results as obtained through the processing written as Formula 8.

Second Modification

A second modification of the first embodiment will now be described.

The object detection system according to the present modification has the same structure as described in the above embodiments. The present embodiment will be described focusing on its differences from the above embodiments. The components that are the same as in the above embodiments are given the same reference numerals as those embodiments and will not be described in detail.

A symmetry evaluation unit 222 of the present modification performs the processing written as Formula 10 below instead of Formula 8. Although the weighting in the vertical direction is performed using a value of 1 (without weighting) for each of all the horizontal lines in the processing written as Formula 10, the weighting is performed for each horizontal line using a weighting function d(m), which provides weighting in accordance with the function d(m) in the processing written as Formula 10.

Formula 10

$$SYM_w(i, j) = \frac{1}{2n+1} \sum_{m=j-n}^{j+n} \left[ d(m) * \frac{1}{w} \sum_{k=1}^{w} \{(255 - |P_{i-k,m} - P_{i+k,m}|) * P_{i-k,m} * P_{i+k,m}\} \right] \quad (10)$$

For example, d(m)=n+1−|m−j|, or d(m)=c1×exp(−c2× (m−j)^2), where c1 is a coefficient (a positive coefficient) to determine the maximum value of d(m), and c2 is a coefficient (a positive coefficient) used for range adjustment in the vertical direction. Through this processing, pixels in the horizontal line including the target pixel (i, j) are weighted using a larger value, and pixels in lines more distant from the horizontal line including the target pixel (i, j) are weighted using a smaller value.

As a result, the symmetry evaluation value is calculated to be larger for an area having high horizontal symmetry around a horizontal line including a target pixel (i, j).

The symmetry evaluation unit 222 may use Formula 11 instead of Formula 10 to calculate the symmetry evaluation value $SYM_w(i, j)$.

Formula 11

$$SYM_w(i, j) = \frac{1}{w}\sum_{k=1}^{w}\left[\left(255 - \frac{1}{2n+1}\left|\sum_{m=j-n}^{j+n} d(m)*P_{i-k,m} - \sum_{m=j-n}^{j+n} d(m)*P_{i+k,m}\right|\right) * \right.$$
$$\left\{\frac{1}{2n+1}\sum_{m=j-n}^{j+n}(d(m)*P_{i-k,m})\right\} *$$
$$\left.\left\{\frac{1}{2n+1}\sum_{m=j-n}^{j+n}(d(m)*P_{i+k,m})\right\}\right] \quad (11)$$

In the processing written as Formula 10, the symmetry evaluation unit 222 first evaluates symmetry in the horizontal direction, and then accumulates the symmetry evaluation values in the vertical direction and calculates the average of the accumulated values to obtain the symmetry evaluation value $SYM_w(i, j)$ of the target pixel (i, j).

In the processing written as Formula 11, the symmetry evaluation unit 222 first performs the processing of accumulating values of each term in the vertical direction (average value calculation), and then evaluates symmetry in the horizontal direction to calculate the symmetry evaluation value $SYM_w(i, j)$ of the target pixel (i, j).

The symmetry evaluation unit 222 performs the processing written as Formula 11 to obtain the same processing results as obtained through the processing written as Formula 10.

Second Embodiment

A second embodiment will now be described.

An object detection system according to the present embodiment has the same structure as in the first embodiment. The present embodiment will be hereafter described focusing on its differences from the first embodiment. The components that are the same as in the above embodiments are given the same reference numerals as those embodiments and will not be described in detail.

In the first embodiment, the image feature quantity extraction unit 221 uses an edge component as an image feature quantity of an object. The image feature quantity extraction unit 221 evaluates the symmetry using the edge component extracted as the image feature quantity.

In the second embodiment, the image feature quantity extraction unit 221 uses a specific color component as an image feature quantity of an object. For example, the image feature quantity extraction unit 221 extracts a red component as an image feature quantity.

The operation of the object detection system according to the present embodiment will now be described.

Figure 8A:
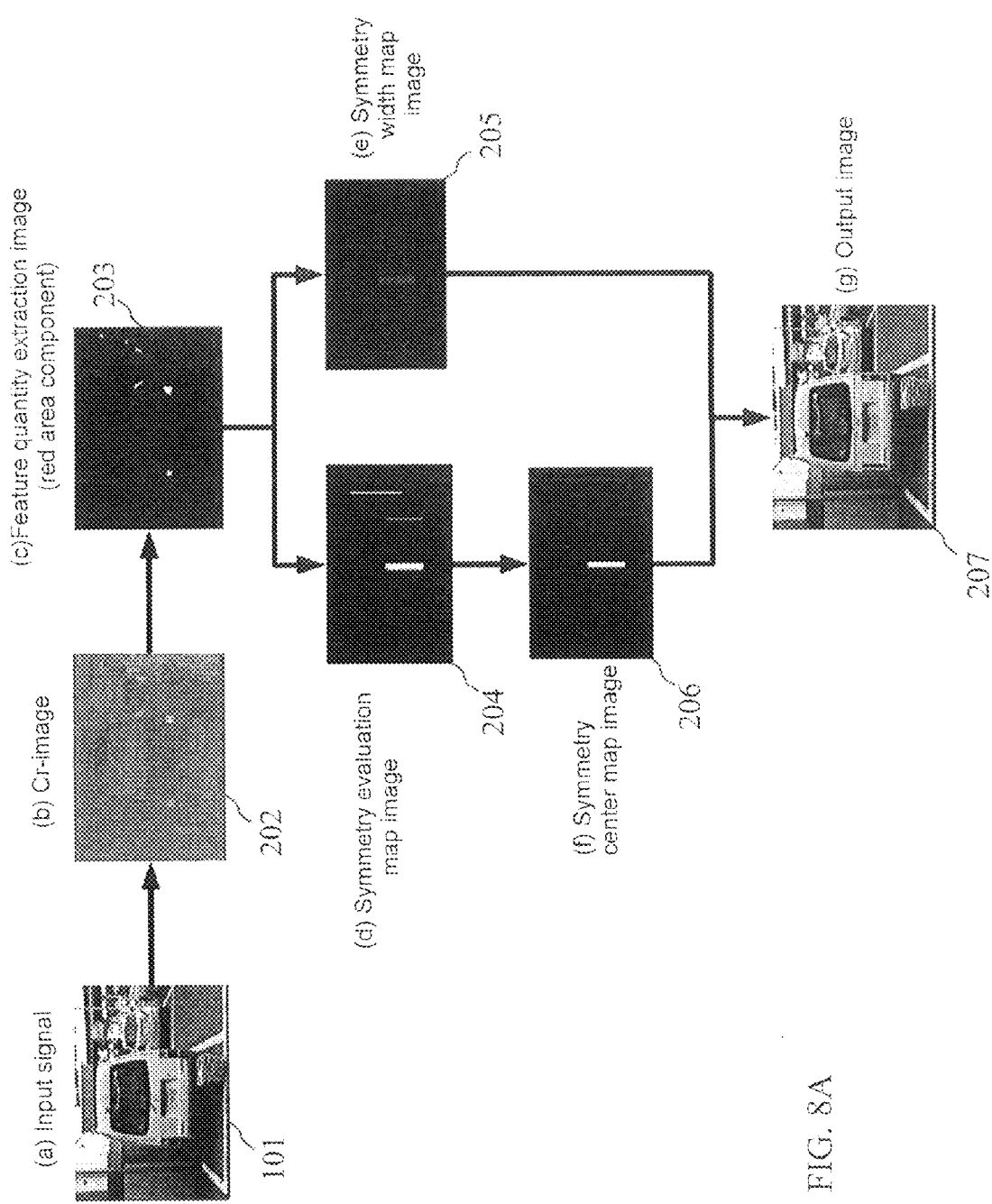
FIG. 8A is a diagram showing example images generated in the steps of object detection implemented by an object detection system according to a second embodiment.
Figure 8B:
FIG. 8B shows a Cr-component image 202 generated by extracting a Cr component from the input image 101.

FIG. 8A shows example images generated in the steps of object detection implemented by the object detection system of the present embodiment.

In the present embodiment as well, the imaging apparatus 1 obtains the captured image 101 shown in FIG. 4A. The captured image 101 is then processed in the object detection apparatus 2.

The image input unit 21 converts image signals defined in the RGB color space (an R-component signal, a G-component signal, and a B-component signal), which are input from the imaging apparatus 1, into signals defined in the YCbCr color space (a Y-component signal, a Cb-component signal, and a Cr-component signal). The image input unit 21 outputs the Cr component signal (Cr-component image 202) to the image feature quantity extraction unit 221.

The image feature quantity extraction unit 221 subjects the Cr-component image (color difference red component image) 202, which is obtained by the image input unit 21, to processing for extracting an image feature quantity. In the present embodiment, a physical quantity correlated with the Cr component is used as the image feature quantity.

In the present embodiment, the image feature quantity extraction unit 221 subjects the Cr-component image 202 to processing for enhancing the Cr component (enhancement) to generate a feature-quantity extraction image (an R-component image, or a Cr-component enhanced image) 203.

The processing performed subsequently is the same as described in the first embodiment. The same processing is performed except that the edge image in the first embodiment is replaced with the R-component image to detect a symmetrical object.

Figure 8C:
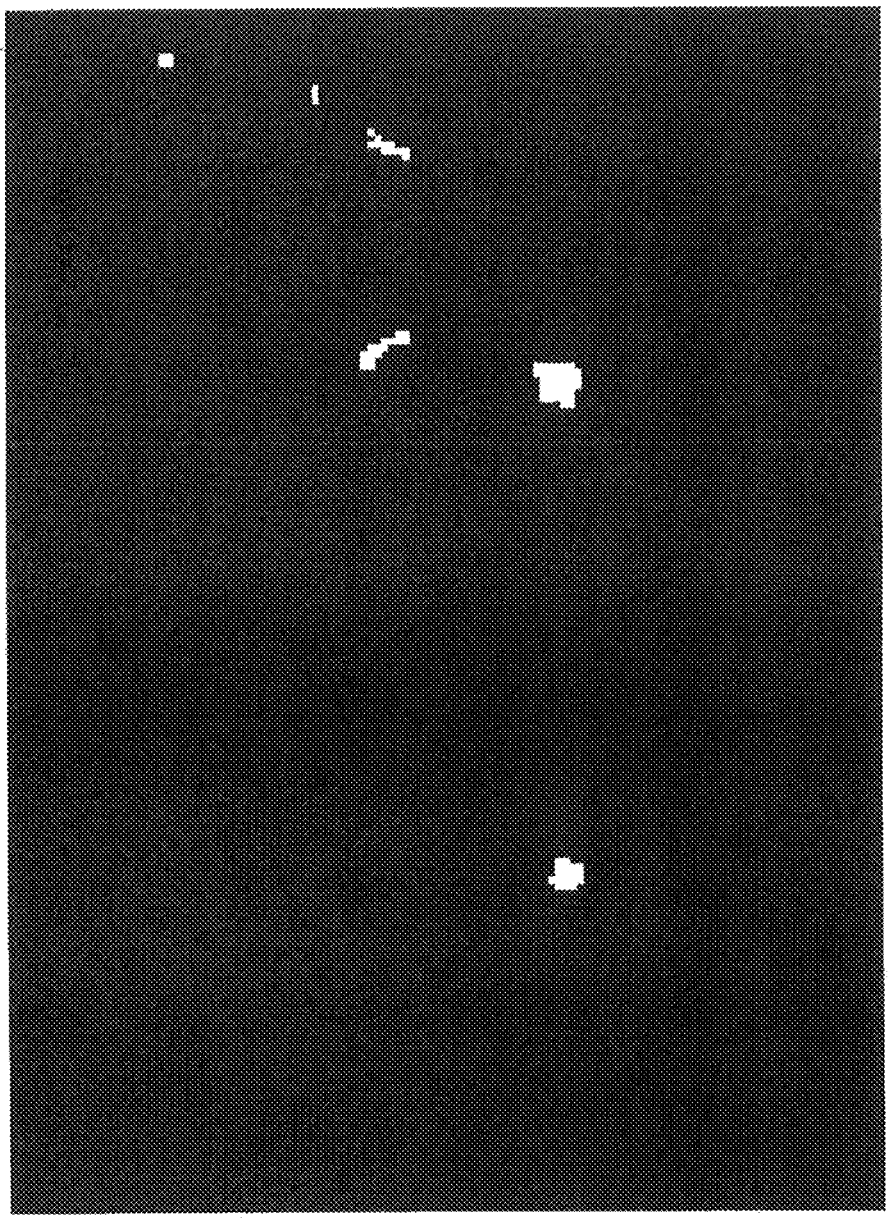
FIG. 8C shows a feature-quantity extraction image (an R-component image, or a Cr-component enhanced image) 203.
Figure 8D:
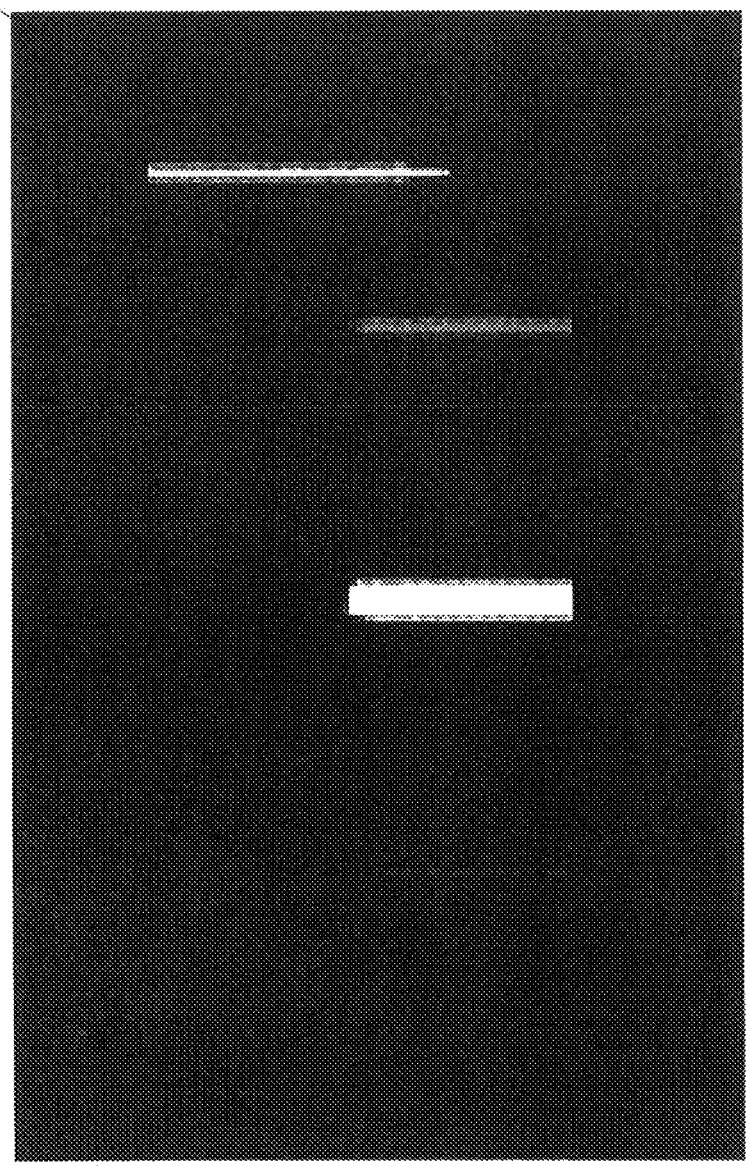
FIG. 8D shows a symmetry evaluation map image 204.
Figure 8E:
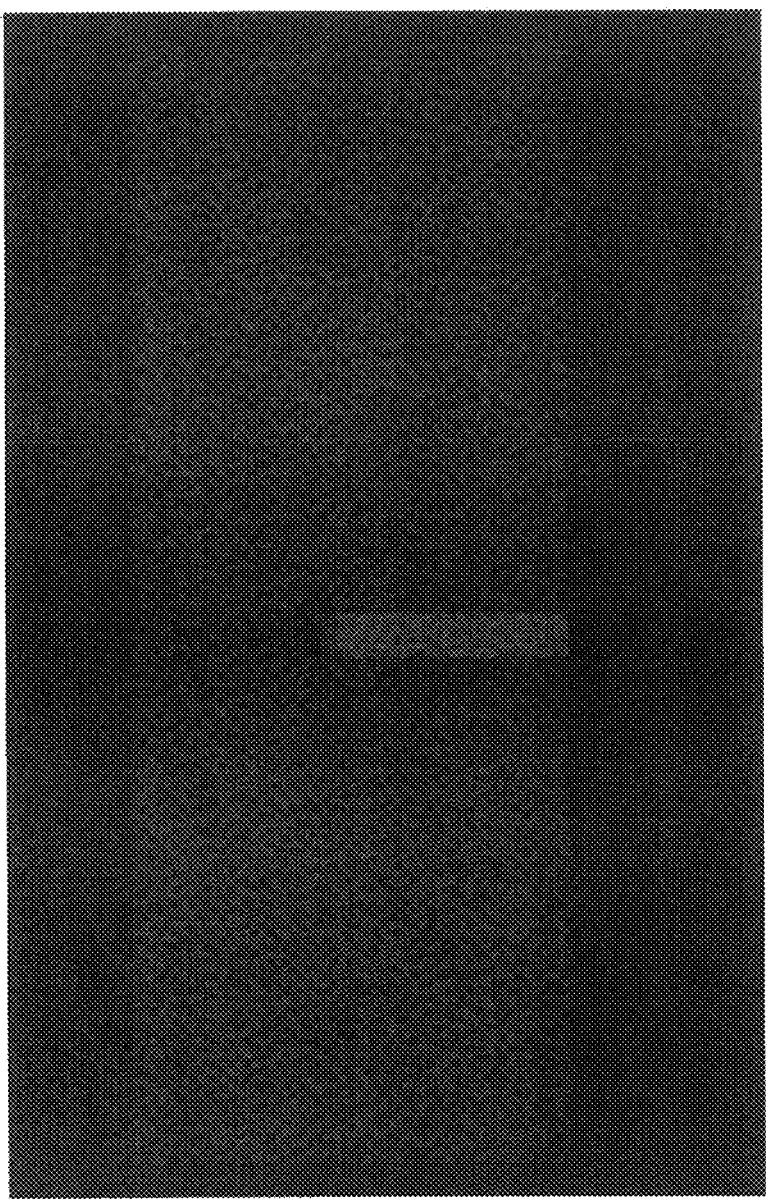
FIG. 8E shows a symmetry width map image 205.

More specifically, the symmetry evaluation unit 222 subjects the feature-quantity extraction image (the R-component image, or the Cr-component enhanced image) 203 shown in FIG. 8C to the same processing as in the first embodiment to obtain symmetry evaluation map data (corresponding to the symmetry evaluation map image 204 shown in FIG. 8D) and symmetry width map data (corresponding to the symmetry width map image 205 shown in FIG. 8E).

Figure 8F:
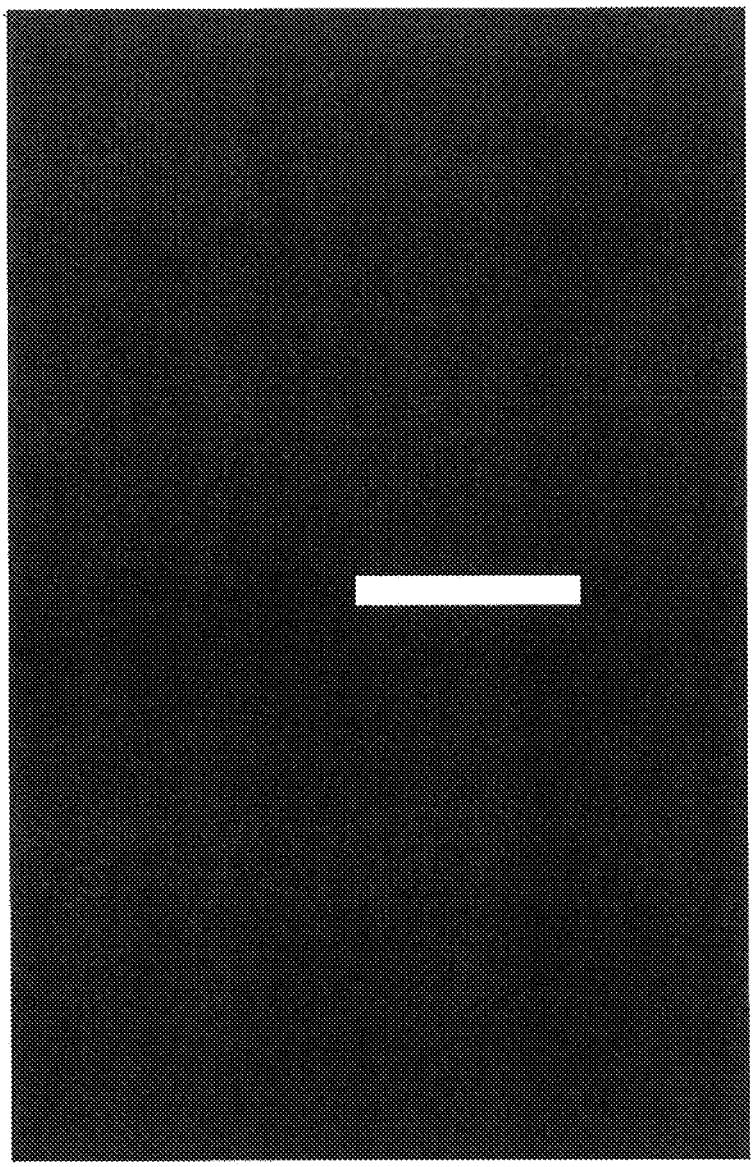
FIG. 8F shows a symmetry center map image 206.

The center detection unit 223 subjects the symmetry evaluation map data (corresponding to the symmetry evaluation map image 204 shown in FIG. 8D) to the same processing as in the first embodiment to obtain symmetry center map data (corresponding to the symmetry center map image 206 shown in FIG. 8F).

The object area detection unit 224 subjects the symmetry center map data (corresponding to the symmetry center map image 206 shown in FIG. 8F) and the symmetry width map data (symmetry width map image 205) to the same processing as in the first embodiment to detect the width of the object in the horizontal direction, and to further detect the width of the object in the vertical direction.

In the same manner as in the first embodiment, the superimposing unit 23 generates (superimposes) an image indicating an image area corresponding to the highly symmetrical object on an image output from the image input unit 21 (an input image 101) based on information identifying an area corresponding to the detected highly symmetrical object in the image output from the object area detection unit 224.

Figure 8G:
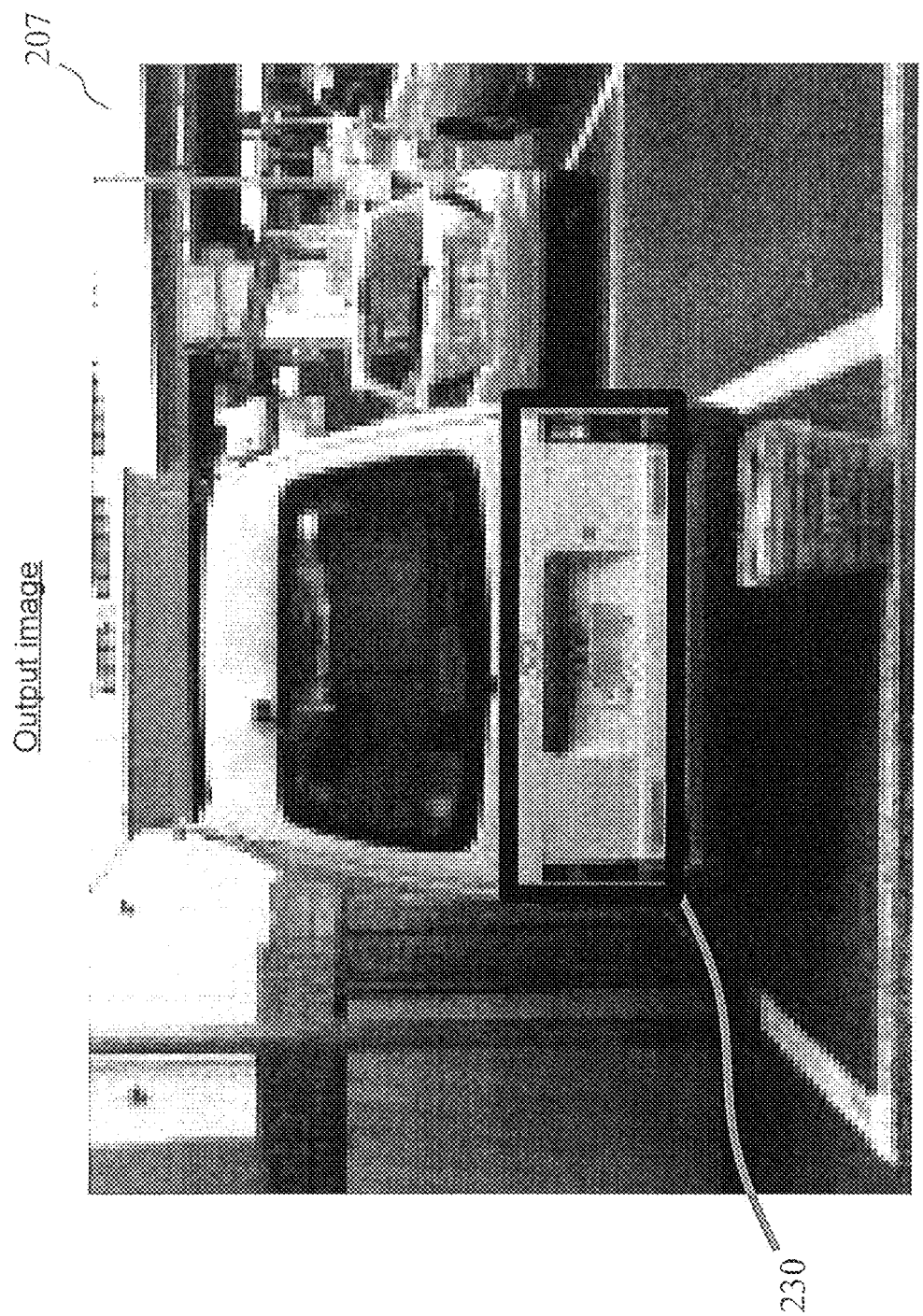
FIG. 8G shows a composite image (an output image) 207 including a superimposed area frame 230.

The image generated (generated through superimposing) by the superimposing unit 23 is displayed by the display apparatus 3. FIG. 8G shows an example of an image (output image 207) obtained by the superimposing unit 23. As shown in FIG. 8G, an area (an image area 230) including red image portions at horizontally symmetrical positions is detected in an appropriate manner.

FIG. 8G shows the composite image 207 displayed by the display apparatus 3 in the second embodiment. In the first embodiment, the symmetry of an object is evaluated using the edge component, and thus the size of the entire vehicle is detected as the size of the object. Unlike this, the symmetry of an object is evaluated by focusing on the red color of the tail lamps of the vehicle in the second embodiment. Thus, an area including the tail lamps (an image area 230) is extracted.

As described above, the object detection system of the present embodiment evaluates symmetry in a predetermined direction (horizontal direction) in an image obtained by extracting an image feature quantity from an input image (captured image) (an image obtained by extracting a specific color component) by varying the width of the image (the width in the predetermined direction, which is the horizontal direction). When determining that a predetermined image area has high symmetry, the object detection system of the present embodiment can obtain the width of the image area determined to have high symmetry in the predetermined direction (horizontal direction) at the same time. In other words, the object detection system of the present embodiment can extract the position and the size of an object at one time using the symmetry of the object included in the image.

The object detection system of the present embodiment can detect the central axis of a highly symmetrical object using evaluation data for symmetry in a predetermined direction (horizontal direction). The object detection system of the present embodiment can thus detect a highly symmetrical object with high accuracy using less arithmetic processing. Further, the object detection system of the present embodiment uses an image obtained by extracting a specific color component, and can thus detect a highly symmetrical object containing a large quantity of specific color component with high accuracy.

The first embodiment and the second embodiment may be combined with each other. An edge image is used to determine the vertical width and position of an object and the horizontal width and position of the object. Further, a specific color component image is used to determine the vertical width and position of the object and the horizontal width and position of the object. The averages of the values obtained from these images are then used to identify the width and the position of the object. Alternatively, either the values obtained from the edge image or the values obtained from the color component image may be weighted, and the resulting values may be used to identify the position and the size of the object.

In the above embodiment, the processing focuses on the red component. The embodiment should not be limited to this example. The processing may focus on another color component (e.g., a green component or a blue component) to detect an object having high symmetry for the predetermined color.

The color space conversion for extracting an image feature quantity should not be limited to the conversion described in the above embodiment, but may be other color space conversion for extracting a signal of a specific color component to extract a predetermined color component signal (color component image).

In the present embodiment, the same processing in the first modification and the second modification of the first embodiment may be performed.

Other Embodiments

Some or all of the above embodiments and modifications may be combined.

In the above embodiments, an object having symmetry in the horizontal direction is detected. In the same manner, an object having symmetry in the vertical direction may also be detected. More specifically, the processing described in the first and second embodiments may be performed by reversing the direction of processing between the horizontal and vertical directions in the first and second embodiments to detect an object having symmetry in the vertical direction.

Some or all of the functional units of the object detection apparatus 2 according to the above embodiments may use a shared memory (e.g., a frame memory) in their processing.

When the imaging apparatus included in the object detection system of each of the above embodiments captures a color image at a predetermined frame rate (e.g., 15 fps), the shared memory preferably has a capacity that allows the object detection apparatus to process the color image at the predetermined frame rate (e.g., 15 fps).

The above embodiments describe the processing to be performed on 8-bit data (data of 0 to 255) (e.g., the processing written as the Formula 4 or the like), the number of bits of data to be processed should not be limited to the number of bits (the possible range of data) described above.

Each block of the object detection system or the object detection apparatus described in the above embodiments may be formed using a single chip with a semiconductor device (an integrated circuit or a field programmable gate array (FPGA)), such as an LSI (large-scale integration) device, or some or all of the blocks of the object detection system and the object detection apparatus may be formed using a single chip. Each block of the object detection system or the object detection apparatus described in the above embodiments may be formed using a plurality of chips (semiconductor devices such as LSI devices)

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware. When the object detection system and the object detection apparatus of the above embodiments are implemented by hardware, the object detection system and the object detection apparatus need timing adjustment for their processes. For ease of explanation, the timing adjustment associated with various signals used in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc (registered trademark), or a semiconductor memory.

The computer program may not be recorded on the recording medium but may be transmitted with an electric communication line, a radio or cable communication line, or a network such as the Internet.

The specific structures described in the above embodiments are mere examples of the present invention, and may be changed and modified variously without departing from the scope and the spirit of the invention.

REFERENCE SIGNS LIST

1000 object detection system
1 imaging apparatus
2 object detection apparatus
3 display apparatus (monitor)
21 image input unit
22 object detection unit
23 superimposing unit
221 image feature quantity extraction unit 222 symmetry evaluation unit
223 center detection unit
224 object area detection unit
23 superimposing unit

The invention claimed is:

1. An object detection apparatus, comprising:
an image input unit including circuitry configured to receive an image;
an image feature quantity extraction unit configured to extract a predetermined image feature quantity from the image to generate a feature-quantity extraction image; and
a symmetry evaluation unit configured to set, for every processing target pixel in the feature-quantity extraction image, a symmetry evaluation area for evaluating symmetry in a first direction in the image in such a manner that the symmetry evaluation area is symmetrical with respect to a central axis in a second direction orthogonal to the first direction, and calculates a weighted value resulting from weighting a value indicating a correlation value by an image feature quantity for a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the symmetry in the first direction, and configured to calculate the symmetry evaluation value by varying a value of w either within a first range or a second range that is different from the first range, based on whether a value of a row indicating a position of the target pixel in the first direction is greater than or less than H/2, where w is a half of a width of the symmetry evaluation area in the first direction and H is a number of pixels in the first direction of the image.

2. The object detection apparatus according to claim 1, wherein
the symmetry evaluation unit determines a width of the symmetry in the first direction based on the size of the symmetry evaluation area corresponding to the symmetry evaluation value indicating the highest symmetry in the first direction.

3. The object detection apparatus according to claim 1, wherein
the symmetry evaluation unit calculates the symmetry evaluation value for the target pixel using the formula below:

$$SYM_w(i, j) = \frac{1}{w}\sum_{k=1}^{w} \{(P\max - |P_{i-k} - P_{i+k}|) * P_{i-k} * P_{i+k}\} \quad \text{(cl 3)}$$

while varying a value of 2w+1, where w is a natural number, and
where the symmetry evaluation value is larger when a pixel value in the feature-quantity extraction image is 0 or positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, and 2w+1 is a width of the symmetry evaluation area in the first direction.

4. The object detection apparatus according to claim 1, wherein
the symmetry evaluation unit calculates the symmetry evaluation value for the target pixel using the formula below:

$$SYM_w(i, j) = \frac{1}{2n+1}\sum_{m=j-n}^{j+n}\left[d(m) * \frac{1}{w}\sum_{k=1}^{w}\{(P\max - |P_{i-k,m} - P_{i+k,m}|) * P_{i-k,m} * P_{i+k,m}\}\right] \quad \text{(cl 4-1)}$$

or using the formula below:

$$SYM_w(i, j) = \frac{1}{w}\sum_{k=1}^{w}\left[\left(P\max - \frac{1}{2n+1}\left|\sum_{m=j-n}^{j+n}d(m)*P_{i-k,m} - \sum_{m=j-n}^{j+n}d(m)*P_{i+k,m}\right|\right) * \left\{\frac{1}{2n+1}\sum_{m=j-n}^{j+n}(d(m)*P_{i-k,m})\right\} * \left\{\frac{1}{2n+1}\sum_{m=j-n}^{j+n}(d(m)*P_{i+k,m})\right\}\right] \quad \text{(cl 4-2)}$$

while varying a value of 2w+1, where w is a natural number, and
where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_{i,j}$ is a pixel value of the target pixel located at coordinates (i,j) in the feature-quantity extraction image, 2w+1 is a width of the symmetry evaluation area in the first direction, 2n+1 is a width of the symmetry evaluation area in the second direction, and d(m) is a predetermined weighting function.

5. The object detection apparatus according to claim 4, wherein the weighting function d(m) is $d(m)=1,$ (1)

$d(m)=n+1-|m-j|,$ or (2)

$d(m)=c1 \times \exp(-c2 \times (m-j)^2),$ (3)

where c1 and c2 are predetermined positive coefficients.

6. The object detection apparatus according to claim 3, wherein
the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

7. The object detection apparatus according to claim 1, wherein (1) when the value of the row i indicating the position of the target pixel in the first direction is equal to or less than H/2, the symmetry evaluation unit calculates the symmetry evaluation value by varying a value of w within a range of $1 \leq w \leq (i-1)$, where w is the half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of $1 \leq w \leq (H-i)$.

8. The object detection apparatus according to claim 1, wherein the image feature quantity is an edge intensity of the image.

9. The object detection apparatus according to claim 1, wherein the image feature quantity is an intensity of a specific color component of the image.

10. A non-transitory computer-readable storage medium having stored thereon a program enabling a computer to implement an object detection method comprising:

receiving an image;

extracting a predetermined image feature quantity from the image to generate a feature-quantity extraction image;

setting, for every processing target pixel in the feature-quantity extraction image, a symmetry evaluation area for evaluating symmetry in a first direction in the image in such a manner that the symmetry evaluation area is symmetrical with respect to a central axis in a second direction orthogonal to the first direction, and calculating a weighted value resulting from weighting a value indicating a correlation value by an image feature quantity for a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the symmetry in the first direction; and calculating the symmetry evaluation value by varying a value of w either within a first range or a second range that is different from the first range, based on whether a value of a row indicating a position of the target pixel in the first direction is greater than or less than H/2, where w is a half of a width of the symmetry evaluation area in the first direction and H is a number of pixels in the first direction of the image.

11. An object detection method comprising:

receiving an image;

extracting a predetermined image feature quantity from the image to generate a feature-quantity extraction image;

setting, for every processing target pixel in the feature-quantity extraction image, a symmetry evaluation area for evaluating symmetry in a first direction in the image in such a manner that the symmetry evaluation area is symmetrical with respect to a central axis in a second direction orthogonal to the first direction, and calculating a weighted value resulting from weighting a value indicating a correlation value by an image feature quantity for a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the symmetry in the first direction; and calculating the symmetry evaluation value by varying a value of w either within a first range or a second range that is different from the first range, based on whether a value of a row indicating a position of the target pixel in the first direction is greater than or less than H/2, where w is a half of a width of the symmetry evaluation area in the first direction and H is a number of pixels in the first direction of the image.

* * * * *